United States Patent
Yamamoto et al.

(10) Patent No.: US 7,480,445 B2
(45) Date of Patent: Jan. 20, 2009

(54) VIDEO RECORDING/REPRODUCING APPARATUS HAVING COMMERCIAL VIEW CONTROL FUNCTION

(75) Inventors: Kazumichi Yamamoto, Ebina (JP); Yukio Fujii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 11/637,804

(22) Filed: Dec. 13, 2006

(65) Prior Publication Data

US 2007/0154178 A1   Jul. 5, 2007

(51) Int. Cl.
H04N 5/91    (2006.01)
H04N 7/00    (2006.01)
H04N 5/93    (2006.01)
G11B 27/00   (2006.01)

(52) U.S. Cl. ............... 386/95; 386/52; 386/54; 386/46

(58) Field of Classification Search .......... 386/52, 386/55, 46, 95
See application file for complete search history.

(56) References Cited

U.S. PATENT DOCUMENTS

| | | | | |
|---|---|---|---|---|
| 5,416,693 | A | * | 5/1995 | Yoshinari ............... 700/90 |
| 5,867,226 | A | * | 2/1999 | Wehmeyer et al. ........... 725/46 |
| 6,160,950 | A | * | 12/2000 | Shimazaki et al. ............ 386/46 |
| 6,449,422 | B1 | * | 9/2002 | Ebisawa ...................... 386/52 |
| 6,668,134 | B1 | * | 12/2003 | Niikawa ...................... 386/95 |
| 6,795,092 | B1 | * | 9/2004 | Nagai et al. ................. 715/716 |
| 7,013,477 | B2 | * | 3/2006 | Nakamura et al. ............ 725/32 |
| 7,274,858 | B1 | * | 9/2007 | Hyodo et al. ................. 386/95 |
| 7,424,204 | B2 | * | 9/2008 | Nakamura .................... 386/95 |
| 2005/0276567 | A1 | * | 12/2005 | Okuyama et al. ............. 386/46 |
| 2006/0140580 | A1 | * | 6/2006 | Hiroi et al. ................... 386/52 |
| 2006/0147184 | A1 | * | 7/2006 | Hiroi et al. ................... 386/95 |
| 2006/0165379 | A1 | * | 7/2006 | Agnihotri et al. ............. 386/95 |
| 2006/0222337 | A1 | * | 10/2006 | Fujikawa et al. ............. 386/95 |
| 2007/0154178 | A1 | * | 7/2007 | Yamamoto et al. ............ 386/95 |

FOREIGN PATENT DOCUMENTS

JP    2003-163865    6/2003

* cited by examiner

*Primary Examiner*—Thai Tran
*Assistant Examiner*—Daquan Zhao
(74) *Attorney, Agent, or Firm*—Antonelli, Terry, Stout & Kraus, LLP.

(57) ABSTRACT

Within a television broadcast recording/reproducing apparatus, for preventing a commercial message (CM) from being cut when viewing an abridgement (digest), and for presenting the CM to a viewer without losing an advantage of viewing the abridgement, a ranking value of a CM portion is changed, with using a means for evaluating video and audio by one (1) frame thereof, thereby to give a ranking value thereto, and a means for detecting a CM portion.

21 Claims, 38 Drawing Sheets

| | STREAM NAME | CM ID | ABRIDGING RATIO | CM STREAM ID | FRAME NUMBER | TYPE | DISPLAY FRAME NUMBER COUNT |
|---|---|---|---|---|---|---|---|
| 245 | PROGRAM "A" | CM2 | 0%~40% | A2T1 | 300 | REDUCED-VERSION | 300 |
| 246 | PROGRAM "A" | CM2 | 41%~70% | A2T2 | 450 | REDUCED-VERSION | 450 |
| 247 | PROGRAM "A" | CM3 | 0%~50% | A3O1 | 30 | OVERLAID-VERSION | 1800 |
| 248 | PROGRAM "A" | CM3 | 51%~80% | A3O2 | 1 | OVERLAID-VERSION | 3600 |
| | ⋮ | ⋮ | ⋮ | ⋮ | ⋮ | ⋮ | ⋮ |

| STREAM NAME | START POINT | END POINT |
|---|---|---|
| PROGRAM "A" | 20000 | 25000 |
| PROGRAM "A" | 60000 | 63000 |
| PROGRAM "A" | 80000 | 84000 |
| EOS | | |

FIG.5
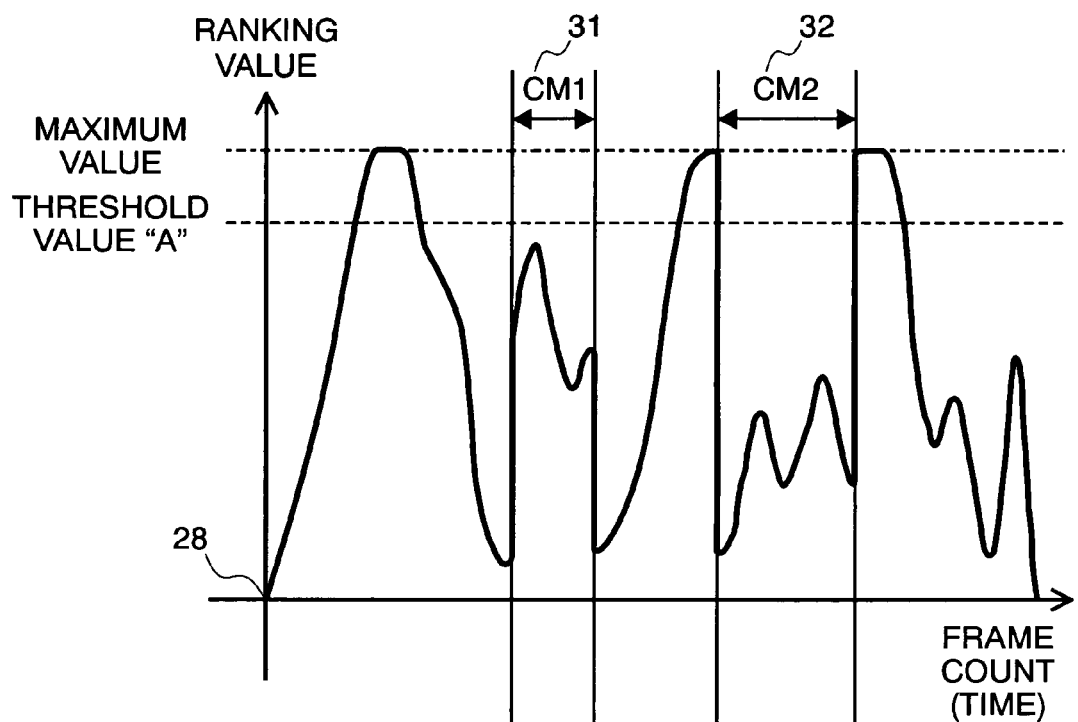
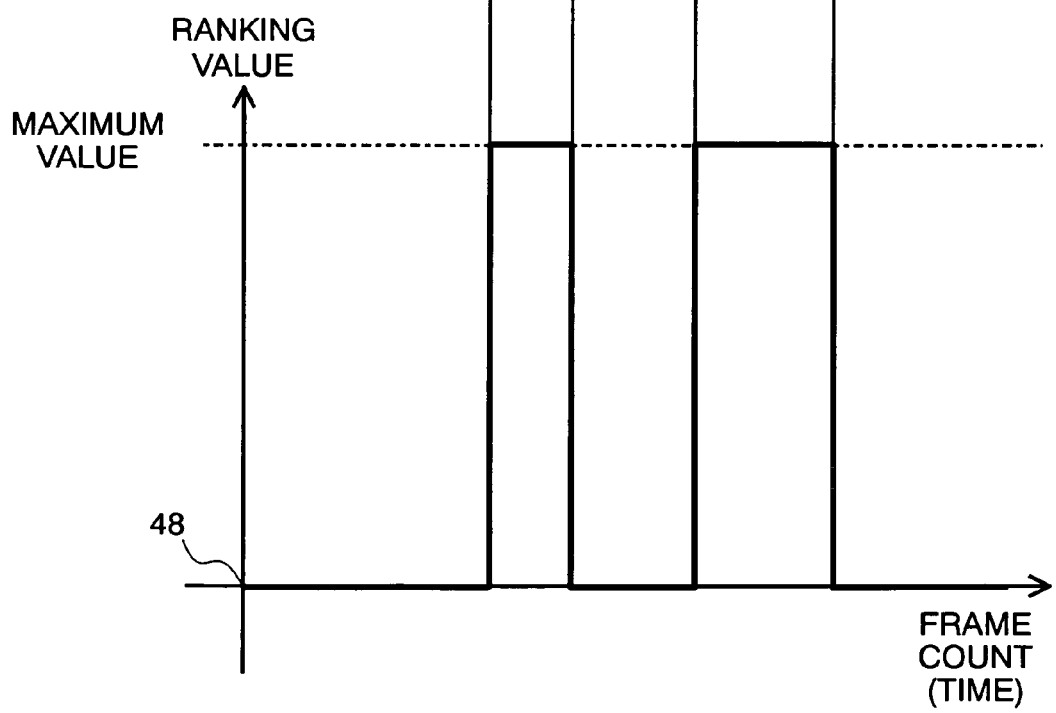

FIG.7
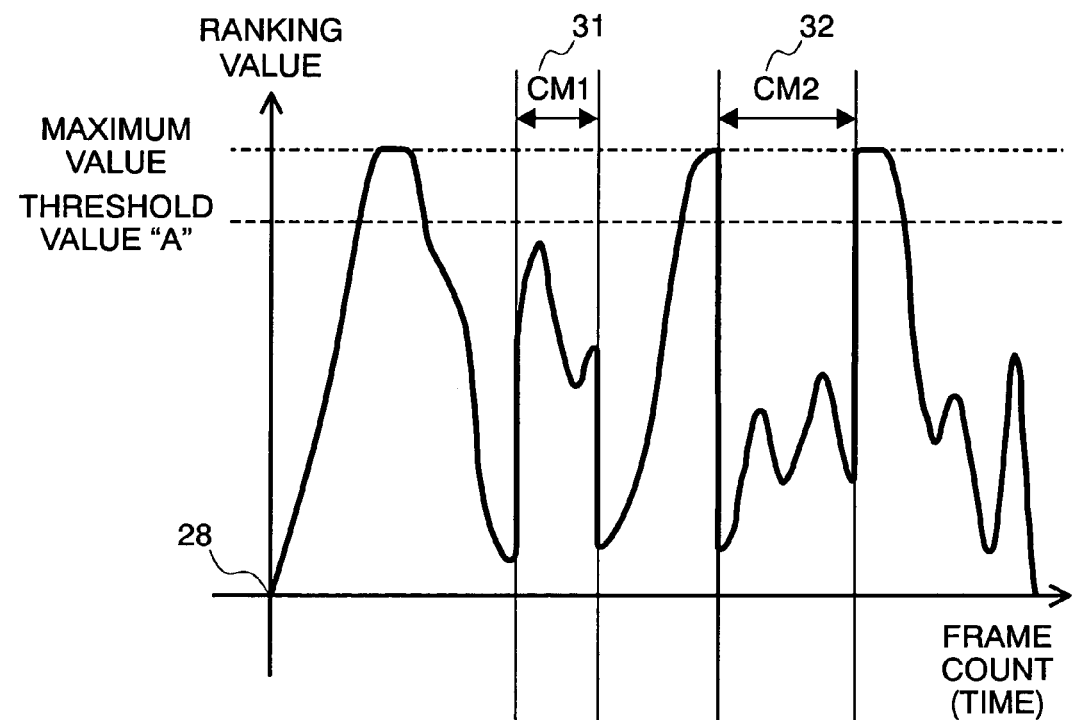
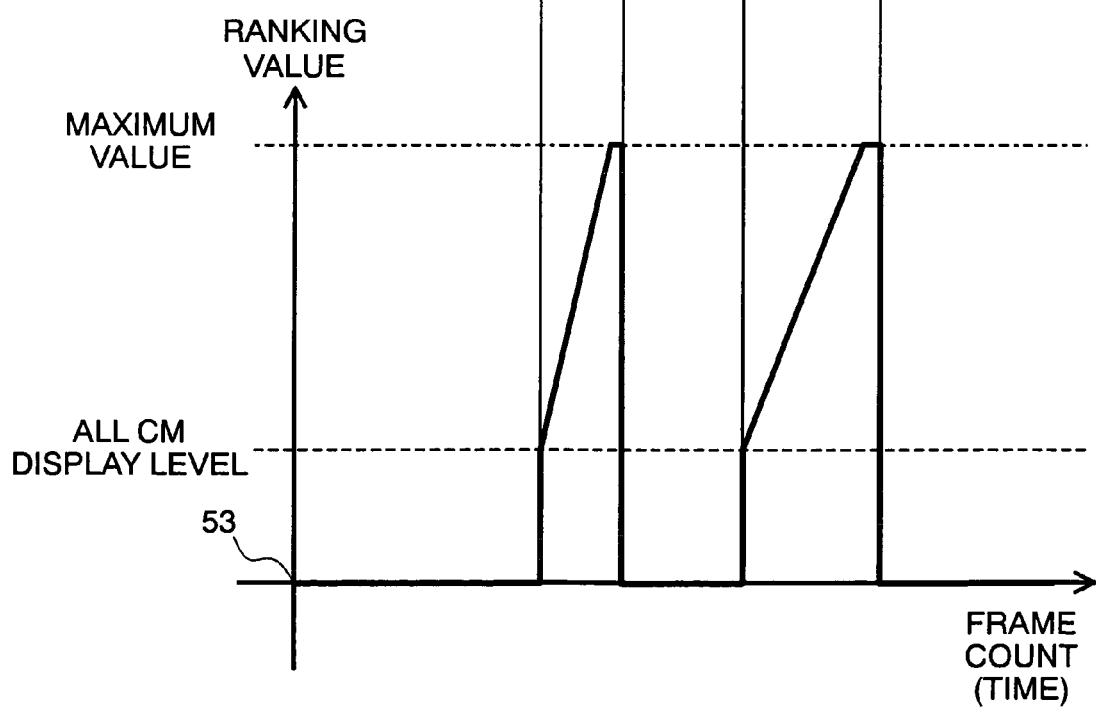

FIG.14

| | VIDEO DATA ID | CM ID | REPRODUCING NUMBER OF TIME | COUNT HISTORY |
|---|---|---|---|---|
| | PROGRAM "A" | CM1 | 1 | YES |
| | PROGRAM "A" | CM2 | 0 | NO |
| | PROGRAM "A" | CM3 | 0 | NO |
| | ⋮ | ⋮ | ⋮ | ⋮ |

| RECORD DATA ID | CM ID | START-POINT | END-POINT |
|---|---|---|---|
| PROGRAM "A" | CM1 | 1589 | 2489 |
| PROGRAM "A" | CM2 | 10974 | 11424 |
| PROGRAM "A" | CM3 | 27648 | 28548 |
| ⋮ | ⋮ | ⋮ | ⋮ |

FIG.20

| FRAME NUMBER | RANKING VALUE |
|---|---|
| ⋮ | ⋮ |
| 10000 | 53 |
| 10001 | 54 |
| 10002 | 55 |
| 10003 | 55 |
| ⋮ | ⋮ |

FIG.21

| FRAME NUMBER | RANKING VALUE |
|---|---|
| ⋮ | ⋮ |
| 19830 | 0 |
| 19831 | (MAX. VALUE) |
| ⋮ | ⋮ |
| 20280 | (MAX. VALUE) |
| 20281 | 0 |
| ⋮ | ⋮ |

FIG.22

| FRAME NUMBER | RANKING VALUE |
|---|---|
| ⋮ | ⋮ |
| 10000 | 53 |
| ⋮ | ⋮ |
| 19830 | 47 |
| 19831 | (MAX. VALUE) |
| ⋮ | ⋮ |
| 20280 | (MAX. VALUE) |
| 20281 | 65 |
| ⋮ | ⋮ |

FIG.24

| FRAME NUMBER | RANKING VALUE | CM ID |
|---|---|---|
| ⋮ | ⋮ | ⋮ |
| 10000 | 53 | null |
| ⋮ | ⋮ | ⋮ |
| 19830 | 47 | null |
| 19831 | (MAX. VALUE) | CM1 |
| ⋮ | ⋮ | ⋮ |
| 20280 | (MAX. VALUE) | CM1 |
| 20281 | 65 | null |
| ⋮ | ⋮ | ⋮ |

FIG.31

| CM ID | RELATIVE TIME | RANKING RATIO |
|---|---|---|
| ⋮ | ⋮ | ⋮ |
| CM1 | t1 | 100% |
| ⋮ | ⋮ | ⋮ |
| CM1 | t2 | 10% |
| CM2 | t3 | REPLACE |
| CM2 | t4 | REPLACE |
| CM3 | t5 | REPLACE |
| CM3 | t6 | REPLACE |
| ⋮ | ⋮ | ⋮ |

FIG.32

| | FRAME NUMBER | RANKING VALUE | CM ID |
|---|---|---|---|
| 233 | 19831 | MAX.VALUE | CM1 |
| | ⋮ | ⋮ | ⋮ |
| 234 | 20280 | 30 | CM1 |
| 235 | 34350 | REPLACE | CM2 |
| 278 | 35249 | REPLACE | CM2 |
| 236 | 46820 | REPLACE | CM3 |
| 279 | 47719 | REPLACE | CM3 |
| | ⋮ | ⋮ | ⋮ |

| STREAM NAME | CM ID | ABRIDGING RATIO | CM STREAM ID | FRAME NUMBER | TYPE | DISPLAY FRAME NUMBER COUNT |
|---|---|---|---|---|---|---|
| PROGRAM "A" | CM2 | 0%~40% | A2T1 | 300 | REDUCED-VERSION | 300 |
| PROGRAM "A" | CM2 | 41%~70% | A2T2 | 450 | REDUCED-VERSION | 450 |
| PROGRAM "A" | CM3 | 0%~50% | A3O1 | 30 | OVERLAID-VERSION | 1800 |
| PROGRAM "A" | CM3 | 51%~80% | A3O2 | 1 | OVERLAID-VERSION | 3600 |
| ... | ... | ... | ... | ... | ... | ... |

FIG.34

| FRAME NUMBER | RANKING VALUE | CM ID |
|---|---|---|
| ⋮ | ⋮ | ⋮ |
| 10000 | 53 | null |
| ⋮ | ⋮ | ⋮ |
| 19831 | MAX.VALUE | CM1 |
| ⋮ | ⋮ | ⋮ |
| 20280 | 30 | CM1 |
| ⋮ | ⋮ | ⋮ |
| 34350 | REPLACE | CM2 |
| 35249 | REPLACE | CM2 |
| ⋮ | ⋮ | ⋮ |
| 46820 | REPLACE | CM3 |
| 47719 | REPLACE | CM3 |
| ⋮ | ⋮ | ⋮ |

FIG.35

| | STREAM NAME | START-POINT FRAME NUMBER | END-POINT FRAME NUMBER | OVERLAY |
|---|---|---|---|---|
| 263 | PROGRAM "A" | 10000 | 18000 | null |
| 264 | PROGRAM "A" | 19830 | 20280 | null |
| 265 | PROGRAM "A" | 21000 | 32000 | null |
| 266 | A2T2 | 0 | 449 | null |
| 267 | PROGRAM "A" | 36000 | 38000 | null |
| | ⋮ | ⋮ | ⋮ | ⋮ |
| 268 | A3O2 | null | null | OVERLAY |
| 269 | PROGRAM "A" | 47000 | 50000 | null |
| | ⋮ | ⋮ | ⋮ | ⋮ |

FIG.36

| START-POINT FRAME NUMBER | END-POINT FRAME NUMBER | CM STREAM ID | DISPLAY FRAME NUMBER |
|---|---|---|---|
| ⋮ | ⋮ | ⋮ | ⋮ |
| 0 | 0 | A3O2 | 3600 |
| ⋮ | ⋮ | ⋮ | ⋮ |

FIG.38

| STREAM NAME | START-POINT FRAME NUMBER | END-POINT FRAME NUMBER | AVERAGED RANKING VALUE | OVERLAY |
|---|---|---|---|---|
| PROGRAM "A" | 10000 | 13999 | 70 | null |
| PROGRAM "A" | 21000 | 22999 | 80 | null |
| PROGRAM "A" | 36000 | 38999 | 200 | null |
| PROGRAM "A" | 47000 | 52399 | 120 | null |

FIG.39

| STREAM NAME | START-POINT FRAME NUMBER | END-POINT FRAME NUMBER | OVERLAY |
|---|---|---|---|
| PROGRAM "A" | 11000 | 11453 | null |
| A2T2 | 0 | 449 | null |
| A3O2 | null | null | OVERLAY |

FIG.40

| START-POINT FRAME NUMBER | END-POINT FRAME NUMBER | CM STREAM ID | DISPLAY FRAME NUMBER |
|---|---|---|---|
| 0 | 0 | A3O2 | 3600 |

FIG.41

| STREAM NAME | START-POINT FRAME NUMBER | END-POINT FRAME NUMBER | OVERLAY |
|---|---|---|---|
| PROGRAM "A" | 10000 | 13999 | null |
| PROGRAM "A" | 21000 | 22999 | null |
| PROGRAM "A" | 11000 | 11453 | null |
| A2T2 | 0 | 449 | null |
| PROGRAM "A" | 36000 | 38999 | OVERLAY |
| A3O2 | null | null | OVERLAY |
| PROGRAM "A" | 47000 | 52399 | null |

FIG.42

| STREAM NAME | START-POINT FRAME NUMBER | END-POINT FRAME NUMBER | OVERLAY |
|---|---|---|---|
| PROGRAM "A" | 10000 | 13599 | null |
| PROGRAM "A" | 11000 | 11453 | null |
| PROGRAM "A" | 13600 | 13999 | null |
| PROGRAM "A" | 21000 | 22999 | null |
| PROGRAM "A" | 36000 | 37199 | null |
| A2T2 | 0 | 449 | null |
| PROGRAM "A" | 37200 | 38999 | null |
| PROGRAM "A" | 47000 | 48799 | null |
| A3O2 | null | null | OVERLAY |
| PROGRAM "A" | 48800 | 52399 | null |

VIDEO RECORDING/REPRODUCING APPARATUS HAVING COMMERCIAL VIEW CONTROL FUNCTION

BACKGROUND OF THE INVENTION

The present invention relates to a video recording/reproducing apparatus having a function of reproducing a digest (i.e., an abridgement) of contents recorded, and it relates to, in particular, means for controlling a view of commercial message (hereinafter, being abbreviated by "CM").

In recent years, because of widely spreading of a home-use television broadcast recording/reproducing apparatus installing therein a hard disk drive (HDD) therein and/or a personal computer being added with a television broadcast recording/reproducing function, it is possible to record and store a large number of programs therein.

Then, from a viewpoint of viewing the programs recorded, effectively, there are developed a several technologies for producing an abridgement (or a digest) of broadcast.

As an example of such an abridging technology, there is already known a technology, i.e., a CM cut function.

However, in case when using this CM cut function, a problem is caused that, for a program provider (i.e., a sponsor) who provides a fund for production of the program, it is impossible to obtain an effect of CM advertisement.

Then, for dissolving such the problem, as a technology for letting the CM to be viewed, the technology is developed, which is disclosed in Japanese Patent Laying-Open No. 2003-163865 (2003), for example. This technology relates to a CM presentation method of presenting the CM by a predetermined number thereof, when a viewer views a main program edited. With recording the number of times of CM presentations made, reproduction of the main program edited is stopped, temporarily, when the CM presentation does not reach to a predetermined number of times, and then the reproduction of the main program edited is restarted, but after presenting the CM by a number of times remaining until when it reaches to the predetermined number of times; thereby maintaining the chances of presenting the CM to the viewer.

SUMMARY OF THE INVENTION

However, with such the conventional technology as was mentioned above, from a viewpoint of the viewer, there is caused a problem that, though she/he wishes to view only the program contents of her/his interest within a short time, but she/he must view all thereof, in particular, relating to the CM. For example, it is assumed that CM for 6 minutes in total is inserted into a program for 1 hour. Even in case when she/he wishes to view this program contents while abridging it into about 10 minutes, but the CM inserted is reproduced for 6 minutes, necessarily, and then the view time results into 16 minutes in total. This is contrary to an intention of the viewer that she/he wishes to view only a portion of her/his interest within a short time. Depending on the cases, there may be a case that she/he may have a hatred of the CM, which is reproduced in this manner. Such the situation is not preferable also for the provider of programs.

The present invention achieves a method for presenting CM, effectively, in case when viewing an abridgement (or digest) of the program contents.

With a function of abridging the moving pictures, the characteristics of video and audio are extracted from, for example, by a unit of frame (i.e., the frame unit), which builds up the moving pictures, and are estimated or evaluated by means of an estimation function, and thereby recording the estimation result in the form of a ranking value for each the frame unit. In case when producing the abridgement, since the frames are used in the order of heights of the ranking values, it is possible to control the display of CM, by making the ranking value of the CM portion high and the extracting frames of the CM portion by a predetermined number.

BRIEF DESCRIPTION OF THE DRAWINGS

Figure 4:
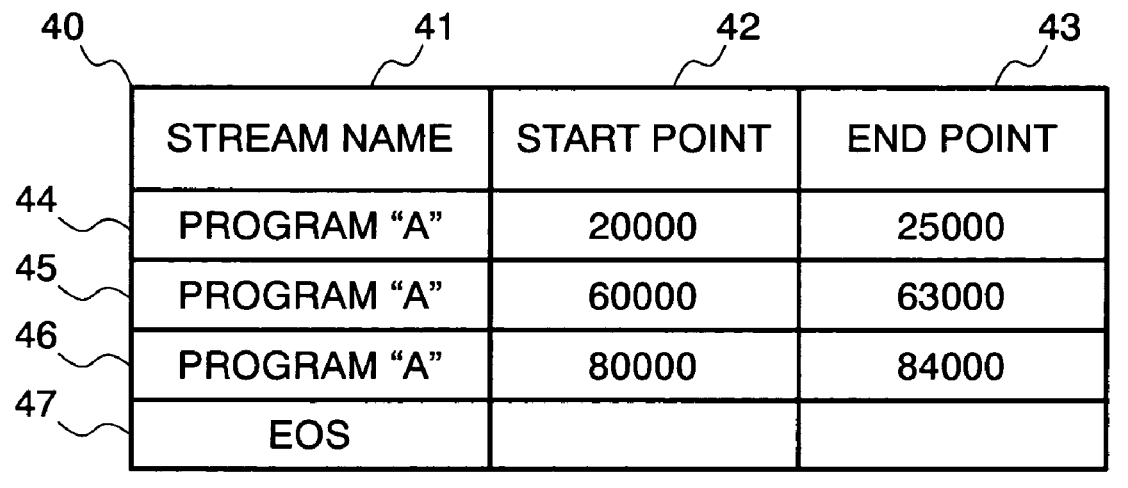

FIG. 4 a view for explaining a play list;

FIG. 5 is a view for explaining a ranking data for CM for reproducing all CM;

FIG. 7 is a view for explaining a ranking data for CM for presenting a part of CM, always;

FIG. 14 is a view for explaining the CM reproducing history;

FIG. 20 shows a ranking data format;

FIG. 21 shows a ranking data format for CM;

FIG. 22 shows the ranking data format, which is composed;

FIG. 24 shows the ranking data format, which is composed;

FIG. 31 is a view for explaining a CM schedule obtainable from the data broadcast;

FIG. 32 shows a ranking data format for CM;

FIG. 33 is a view for explaining a database for CM of reduced version/overlaid version;

FIG. 34 shows the ranking data format, which is composed;

FIG. 35 shows a play list format;

FIG. 36 shows a play list format for CM of overlaid version;

FIG. 38 shows a play list format;

FIG. 39 shows a play list for CM;

FIG. 40 shows a play list for CM of overlaid version;

FIG. 41 shows a play list edited; and

FIG. 42 shows also the play list edited.

DESCRIPTION OF THE PREFERRED EMBODIMENTS

Figure 1:
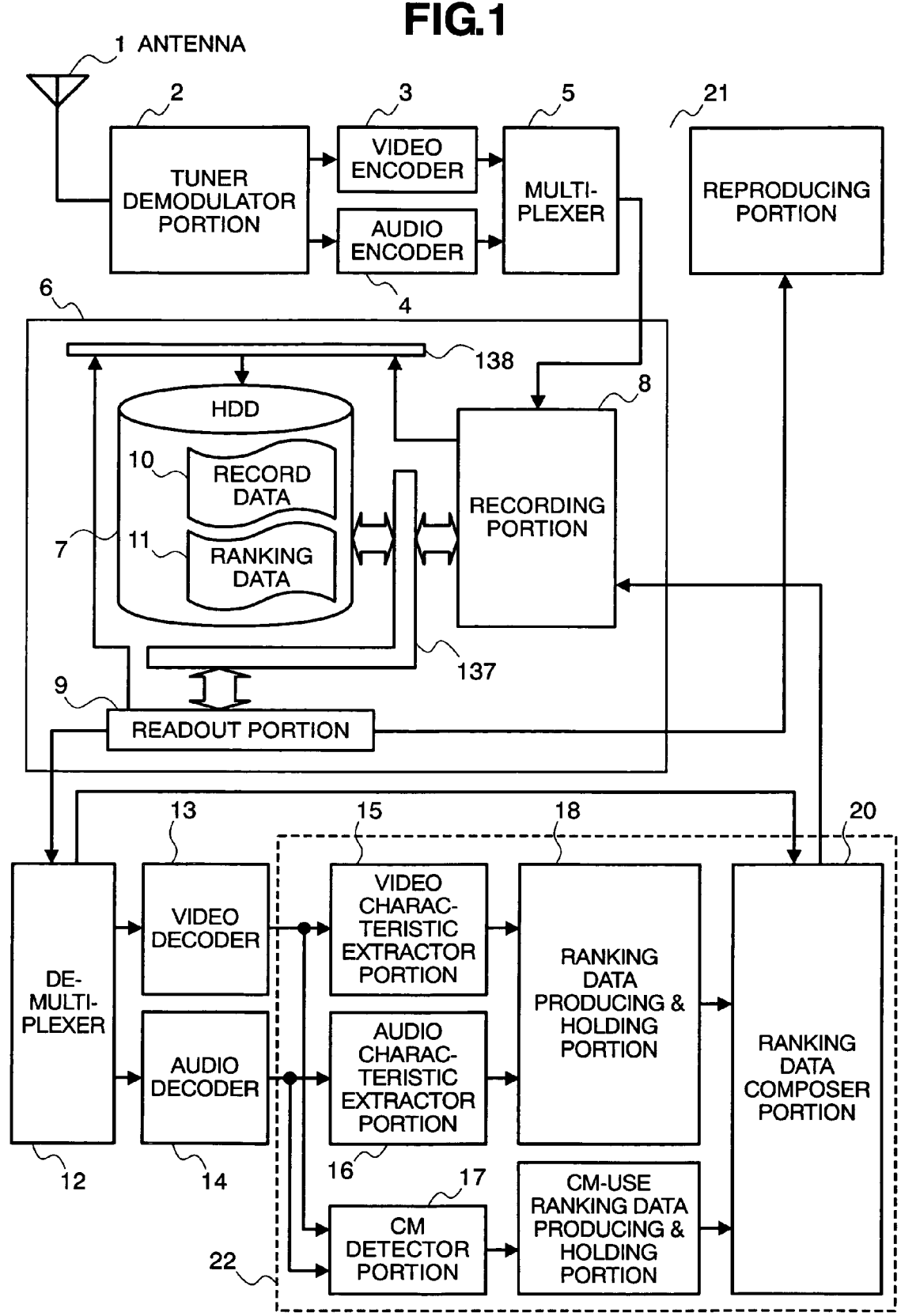
FIG. 1 is the structure view of a video recording/reproducing apparatus for analogue television broadcast.

According to the present invention, the following methods for achieving can be considered, which will be shown below.

As a method for abridging or summarizing the moving pictures is a way of using ranking information therein. With using this ranking information, it is possible to reproduce a predetermined CM, for example, by detecting a CM portion from the moving pictures mentioned above and operating the ranking values thereof within frame estimation of the CM portions detected. For example, bringing the ranking values of all the CM portion to the maximum, then the entire CM recorded can be reproduced.

Also, by changing threshold values thereof, but only relating to the CM portions, it is possible to control the reproduction of CM. For example, lowering down the threshold value in relation to the CM portion than that of the program contents other than the CM, it is possible to increase a ratio or rate of reproduction of the CM portion to be higher than that of the other portions, while conducting the same ranking estimation on the CM portion, as well as, the other portions.

Also, within a plural number of CM detected, operations can be made only upon the ranking values thereof, so that only a predetermined number of frames can be reproduced, i.e., the ranking values are so operated that only the last thirty (30) frames can be reproduced, within each CM portion, for example. In this instance, it is enough to change the ranking values to be the maximum, with respect to the last 30 frames, i.e., the CM portion.

Further, it is also possible to change a reproduction frame number for CM to be proportional to the reproduction ratio of the portions other than CM. It is enough to calculate out the frame number to be reproduced, by multiplying the reproduction ratio with a total value of the frame number of the each CM, and to change the ranking values of the last "X" frames, provisionally, assuming that the number to be calculated is "X", for example. A reference point of the "X" frames can be determined, arbitrarily.

Also, the following method can be considered, as a method for reproducing CM.

A scene is specified or identified, to which belongs the frame having the maximum ranking value throughout the broadcast programs, and in front of that scene is inserted a plural number of CM portions. With doing this, a viewer can notice that the range having a high reproduction ratio of CM is a portion of high estimation of ranking. Herein, a set of continuing frames to be reproduced, is called the scene.

Alternately, CM may be inserted at a predetermined time interval during the time when reproducing the abridgement (or digest). For example, CM is reproduced every time when elapsing 10 seconds, irrespective of interruption of the scene. For the viewer, it is possible to notice the elapsing time at timing of reproduction of CM.

Also, CM of a caption or title version may be displayed, laying it over the screen reproducing the scene thereon.

Or, a reproduction number is recorded for each reproduction of CM, while the ranking value of that CM is lowered down, as the reproduction number thereof increases. With an increase of the reproduction number, the ranking value is lowered down, and when the ranking value goes down to be lower than a threshold value, then it is enough that CM will not be reproduced.

Further, a reduced or shortened version of CM may be broadcasted through the data broadcasting. For example, the reduced version CM for 2 seconds, in reproduction time thereof, is broadcasted onto the main version CM for 15 seconds, in reproduction time thereof, and so on.

Or alternately, the reduced version CM is prepared, in a several kinds of manners thereof for one (1) CM, and the version is changed depending on the number of times of reproduction. For example, while preparing, in advance, CM for 15 second in the reproduction time, CM for 10 second in the same, CM for 5 second in the same, and CM for 2 seconds in the same, then the CM for 15 seconds is reproduced when reproduction is made first time, the CM for 10 seconds when reproduction is made the second, the CM for 5 seconds when reproduction is made the third, and the CM for 2 second when reproduction is made the fourth. The fifth or thereafter, no production may be made or a version shorter than those may be reproduced.

Also, in relation to such as, CM of a topic, etc., in case if there is a CM, which the viewer positively wishes to view, for example, the viewer may change to see the CM of main version, after seeing the reduced version CM, which is inserted therein when reproducing the abridgement (or digest). For example, with provision of a button on a remote controller of the video recording/reproducing apparatus, it may be changed into reproduction of a whole CM, when that button is pushed down during the time when reproducing the reduced version CM. Further, with provision of various kinds of buttons on the remote controller, the CM under viewing may be reproduced, repetitively, or that CM may be stored within a storage region of a memory device.

Hereinafter, explanation will be made, by referring drawings attached.

Embodiments will be explained by referring to the drawings.

FIG. 1 shows the structure view of a video recording/reproducing, according to the present embodiment. Analog video signal and audio signal are taken out from a radio wave of television broadcast obtained on an antenna 1, within a tuner demodulator portion 2. A video encoder 3, receiving the analog video signal from the tuner demodulator portion 2, encodes it into digital signal, thereby outputting an elementary stream (ES) therefrom. Although the method of encoding in the video encoder 3 is arbitrary, but there may be adopted a format, known by "MPEG-2", for example. An audio encoder 4, receiving the audio signal from the tuner demodulator portion 2, encodes it into a digital signal, thereby outputting an elementary stream (ES) therefrom. Although the method of encoding in the audio encoder 4 is arbitrary, but there may be adopted a format, known by "AAC", for example. Herein, "ES" means video data and audio data, which are encoded.

A multiplexer 5, receiving ES from the video encoder 3 and the audio encoder 4, converts them into a video stream, being called "program stream (PS)", obtained from composing both video and audio The PS is recorded onto a hard disk device 6 in the form of video data 10. The "PS" is that, being packetized by each of meaningful unit, such as, a frame unit if "ES" is video, or a block unit if it is audio, etc., for example, and they aligned and added with header information.

Figure 25:
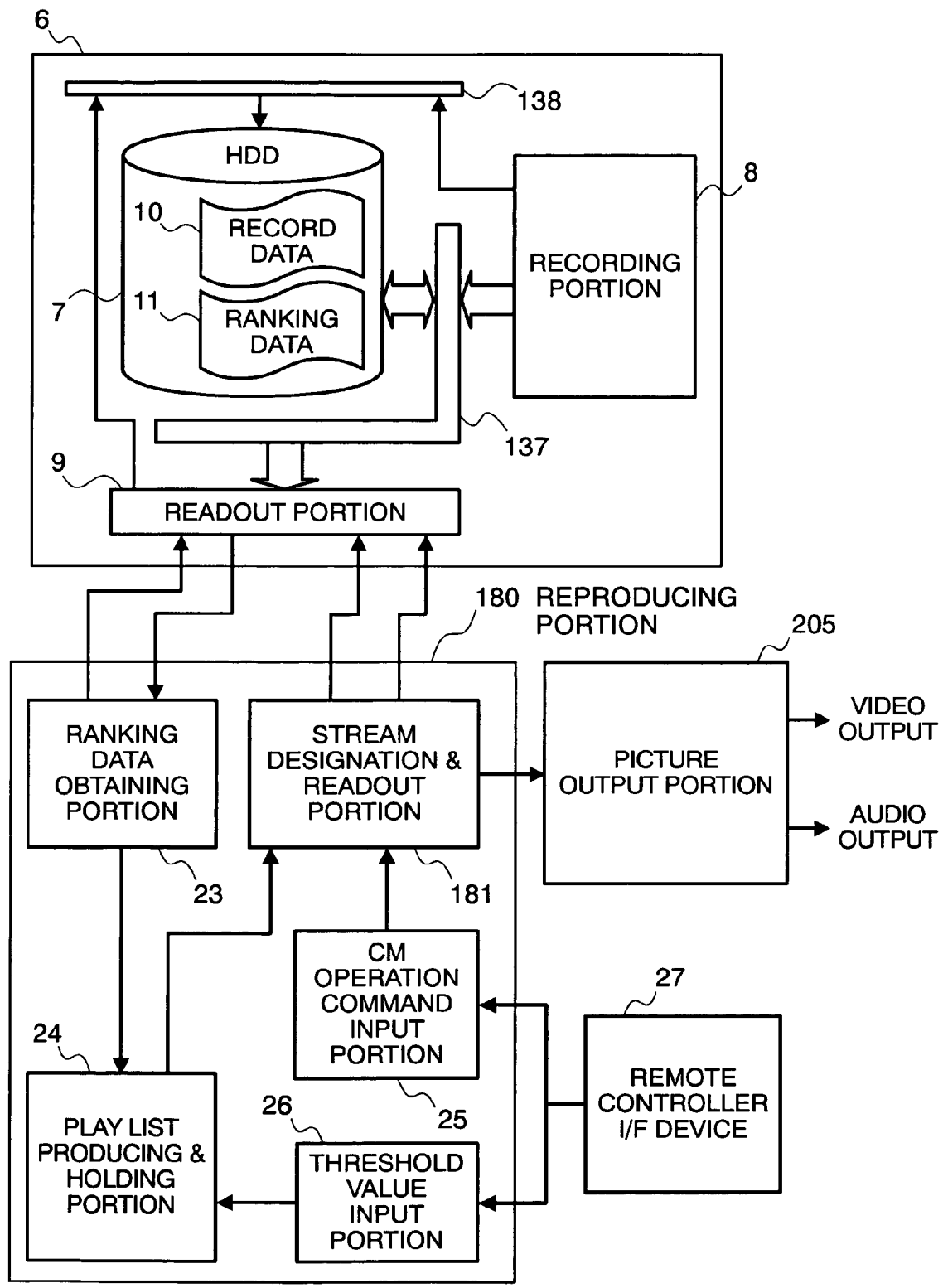
FIG. 25 shows the structure view of a reproducing portion having CM reproduction/storage function.

The hard disk device 6 comprises a hard disk drive 7, a hard disk recording portion 8, a hard disk readout portion 9, a data bus 137 and a command bus 138, and it is able to record the video data 10 and also ranking data 11, which will be mentioned later, etc., in the form of a file, and further it is also able to read out contents of the file designated. Also, the hard disk recording portion 8 can transmit data to be recorded onto the hard disk drive 7 via the data bus 137. The hard disk readout portion 9 can issue a command to the hard disk drive 7 via the command bus 138. Also, the hard disk readout portion 9 is able to obtain data to be read out from the hard disk drive 7 via the data bus 137. The operations mentioned at present are also applicable into those shown in FIGS. 2, 12 and 25, in the similar manner.

Next, explanation will be made on a flow of data into a video estimate portion 22. First of all, a list (i.e., the file) of objects to be produced the ranking thereof is obtained from the hard disk readout portion 9, so as to input it into a de-multiplexer 12. The de-multiplexer 12 divides the stream into video ES and audio ES, and inputs them into a video decoder 13 and an audio decoder 14, respectively. The video decoder 13 outputs a video signal under the condition before being encoded, while the audio decoder 14 an audio signal under the condition before being encoded. And, the de-multiplexer 12 detects an end of the stream, thereby to provide a signal indicative of an end of the stream to a ranking data composer portion 20, which will be mentioned later.

Next, explanation will be made on an inside of the video estimate portion 22. The video signal is inputted into a video characteristic extractor portion 15. In this video characteristic extractor portion 15, estimation is made on the video by each one (1) frame thereof, with an aid of a video estimation function. For example, estimation is made upon a magnitude (large/small) of moving pictures or a degree of changes on a brightness signal, and a result thereof is provided to a ranking data producing and holding portion 18. An example will be listed up, for the estimation function of estimating the video, in more details. Upon comparison between the video frame under estimation and the video frame preceding that by one (1) (i.e., in a sense of time), calculation is made on the degree of changes on the brightness signal. Each screen is divided into blocks of 16 pixels in the vertical direction and 16 pixels in the horizontal direction, and then comparison is made on each of the blocks. Detection of movement is conducted by searching out a block(s), having a similar pattern, of the block on an estimation target, from those within the video frame preceding that by one (1). The searching is made upon, around the block at the position same to that of the block of the estimation target. When the search makes a hit, then calculation is made on the distance between the blocks by a unit of pixel, thereby to use it as the magnitude of the movement. When the search makes no hit, then a search mistake number is counted up, assuming to be a search mistake. With adding up the magnitude of movement for the each block, all over the entire frame, a total value "M" is calculated out of the magnitude of movement. Differing from this, a total number of the blocks, upon which no hit is made, is assumed to be "N", herein.

Also, difference is obtained on the brightness signals (corresponding to the brightness) for each of the blocks, and a total value "L" of the differences on the brightness signals for all of the blocks.

Parameters "M", "N" and "L", which are calculated out, are provided to the ranking data producing and holding portion 18. The audio signal is inputted into an audio characteristic extractor portion 16. In this audio characteristic extractor portion 16, estimation is made on the audio or sound for each one of the frames, by means of an audio estimation function. For example, estimation is made on a degree of changes of sounds, and a result thereof is provided to the ranking data producing and holding portion 18. An example of the estimation function will be shown below, for estimating the audio or sounds, in more details thereof. An audio block, which will be used within the following explanation, is made of the audio data for a time-period corresponding to a display time of one (1) frame of the video. Upon comparison between an averaged sound volume of the audio block under estimation and an averaged sound volume of the audio block preceding that by one (1) (i.e., in a sense of time), calculation is made on the magnitude of changes on the sound volume. A parameter "V" calculated out is provided to the ranking data producing and holding portion 18.

The ranking data producing and holding portion 18 determines a ranking value for the video frame of the estimation target, upon basis of the parameters of video estimation result, which are supplied from the video characteristic extractor portion 15, and the parameters of audio estimation result, which are supplied from the audio characteristic extractor portion 16. In accordance with the example mentioned above, the ranking value is a function of the parameters, i.e., "M", "N", "L" and "V". An example of calculation of the ranking value will be explained. The ranking data producing and holding portion 18 memorizes the parameters of the frames and the ranking values in the past, as the result of estimation thereof, as well as inner variables to be used within the estimation, for a predetermined time, thereby holding them therein. For example, the ranking values of the frames for 15 sec., in the past on the time-sequence, and also a presence of scene changes, which will be mentioned later, are memorized therein. When calculating out the ranking value of a sports program (such as, a succor or the like), the sound volume becomes large or laud, suddenly, and then an assumption can be made that such portions, in which the scene changes happen frequently, are the video frames having a high "importance degree", such as, a scene when winning a goal, for example.

A method for detecting the scene changes will be explained. Upon the video frame just after the scene changes, it can be considered that the parameter "L" indicative of change on the brightness signal be larger than the averaged value of "L", for sec. in the past, and that the value "N" indicative of the number of blocks, on which the search mistake is made in the movement search, be larger than "N" of the frame preceding that by one (1). With the frames under such condition, it can be seen that the scene changes are happened. It is assumed that the number of times of the scene changes for 15 sec. in the past is "S".

With the sound volume, it is assumed there is a frame, the sound volume of which suddenly becomes large or laud, within cases where it comes to be larger than the averaged value of "V"s, for 15 sec. in the past.

The ranking value can be calculated by the following equation:

$$\alpha \times M + \beta \times N + \gamma \times L + \delta \times S + \epsilon \times V \qquad \text{(Eq. 1)}$$

where $\alpha$, $\beta$, $\gamma$, $\delta$ and $\epsilon$ are coefficients.

In the present embodiment, it is assumed that the coefficients, $\alpha$, $\beta$, $\gamma$, $\delta$ and $\epsilon$ are changed depending on a category of the video contents (such as, sports, drama, variety, etc.). This is because the criteria differ from depending upon the categories, for determining the importance degree thereof.

The ranking value in the present embodiment is an infinite integer starting from zero (0), and the ranking value indicates the importance degree of the video frame, which is determined by referring to a video estimation function and an audio estimation function. The ranking values are determined for all of the frames of the video stream, by means of the video characteristic extractor portion 15, the audio characteristic extractor portion 16, and the ranking data producing and holding portion 18. The method for producing this ranking information is described, for example, in "Papers of Electronic Information Communication Association, D-II Vol. J84-D-II No. 8 pp. 8-1, 855, August 2001".

Herein, the ranking value is large of the frame being high in the estimation, and it is small of the frame being low in the estimation. The ranking value is limited and has a value within a predetermined range of values. When reproducing the abridgement, an object of reproduction is made upon the frame, the ranking value of which exceeds a predetermined threshold value. The viewer makes designation of the threshold value. Determination on whether the frame should be reproduced or not is made on a relationship of magnitude between the ranking value of each of the frames and the threshold value. When changing the threshold value to be high, the number of frames is reduced and the time necessary for reproducing the abridgement is shortened. Assuming that a ratio of the number of frames to be reproduced, with respect to the number frames within a predetermined time-period, is called "reproducing ratio", then the reproducing ratio comes to be small when the threshold value is high. Lowering the threshold value brings the reproducing ratio to be large, thereby elongating the time necessary for reproduction of the abridgement.

Also, the ranking data producing and holding portion 18 memorizes the ranking value for each of the frames, on which the estimation was made in the manner mentioned above, pairing it with the frame number. Presenting the information to be memorized in the form of a format, it comes to be a ranking data format 144, as is shown in FIG. 20. This format is composed of a frame number column 145 and a ranking value column 146. A ranking data line 147 indicates that the ranking value of a frame number 10,000 is "53". In the similar manner, ranking data lines 148 to 150 hereinafter indicate the ranking values of the frame numbers 10,001 to 10,003, respectively. This ranking information is read out by means of the ranking data composer portion 20 after ending of the video stream. When all of the ranking data are read out, then the ranking information is deleted.

In the present embodiment, a CM detector portion 17 and a CM-use ranking data producing and holding portion 19 are added into the video estimate portion 22 for producing the ranking values of the respective video frames, while inputting the video stream therein. The CM detector portion 17 has a function of specifying or identifying a CM portion within the video stream of the television broadcast program, while inputting the video signal and the audio signal therein. As a method for identifying the CM portion, there is the method of detecting a time point when an audio mode (such as, monaural/stereo/bilingual) is changed, or a non-sound portion, etc. Determining the ranking value for the CM detected is the function of the CM-use ranking data producing and holding portion 19. In an example explained by referring to FIG. 1, the CM-use ranking data producing and holding portion 19 outputs a constant ranking data (having a fixed value) or a ranking data combining a monotonous change (i.e., increasing or decreasing) and the fixed value. Differing from an example, which will be mentioned later by referring to FIG. 9, the CM-use ranking data producing and holding portion 19 determines the ranking data, but without using the information of neither characteristics of the video nor the information of the audio.

Also, the CM-use ranking data producing and holding portion 19 memorizes the CM-use ranking value, which is produced in the manner mentioned above, paring it with the frame number. Presenting the information to be memorized in the form of a format, it comes to be a ranking data format 151, as is shown in FIG. 21. This format is composed of a frame number column 152 and a ranking value column 153. A ranking data line 154 indicates that the CM-use ranking value of a frame number 19,830 is "0". The frames having the CM-use ranking value "0" are the frames other than that for CM. A ranking data line 155 indicates that the CM-use ranking value of a frame number 19,831 has the maximum value of ranking values. In the similar manner, a ranking data line 156 indicates that the CM-use ranking value of a frame number 20,280 has the maximum value of ranking values. A ranking data line 157 indicates that the CM-use ranking value of a frame number 20,281 is "0". This CM-use ranking information is read out, by means of the ranking data composer portion 20, after ending of the video stream. When all of the ranking data are readout, then this CM-use ranking information is deleted.

The ranking data composer portion 20 composes a ranking value of the frame corresponding to the CM portion within the video stream, and a ranking value of a portion other than that (i.e., the program contents of the television broadcast other than the CM). The composition of the ranking value by means of the ranking data composer portion 20 is started after receiving a signal indicative of an end of the stream from the de-multiplexer 12.

Explanation will be made on an inside of the ranking data composer portion 20, by referring to FIG. 19. The ranking data composer portion 20 reads out the ranking value for each of the frames, from the ranking data producing and holding portion 18 and the CM-use ranking data producing and holding portion 19. A comparator 143 makes comparison on whether the CM-use ranking value, which is read out from the CM-use ranking data producing and holding portion 19, is larger than "0" or not. In case when the CM-use ranking value read out is "0", a logical value "false" is outputted, while a logical value "true" is outputted when the CM-use ranking value is larger than "0".

A switch 142 makes a changeover depending on an output of the comparator 143. In case when the output of the comparator 143 is the logical value "false", selection is made on the ranking data from the ranking data producing and holding portion 18, thereby to output it therefrom. In case when the output of the comparator 143 is the logical value "true", selection is made on the CM-use ranking data from the CM-use ranking data producing and holding portion 19, thereby to output it therefrom.

The ranking data 11, i.e., an output of the ranking data composer portion 20, is recorded in the form of a file, by means of the hard disk recording portion 8 in the hard disk device 6. A format is shown in FIG. 22, when presenting the ranking data 11 in the form of a table. The ranking data format 158 is composed of a frame number column 159 and a ranking value column 160. A ranking data line 161 indicates that the ranking value of the frame of a frame number 10,000 is "53". A ranking data line 162 indicates that the ranking value of the frame of a frame number 19,830 is "47". A ranking data 163 indicates that the frame of a frame number 19,831 has the maximum value of ranking values. A ranking data line 164 indicates that the ranking value of the frame of a frame number 20,280 has the maximum value of ranking values. A ranking data line 165 indicates that the ranking value of a frame of a frame number 20,281 is "65".

Also, the various function blocks, which are described in FIG. 1 and so on, may be achieved by means of an arbitrary CPU (not shown in the figure), a memory, and other LSI, etc., from a viewpoint of hardware, and may be executed by interpreting and/or executing programs for achieving the various function blocks, which are loaded onto the memory by the CPU, from a viewpoint of software. Also, it is understandable for a person skilled in the art that those function blocks can be achieved by the hardware only, or the software only, or a combination of those, i.e., in various modes. Further, the respective programs or data are stored on a memory device, such as, the memory or the hard disk device (not shown in the figure), etc. The structures mentioned above is also applicable in the similar manner, into various structures shown in the figures, which will be explained later.

Figure 2:
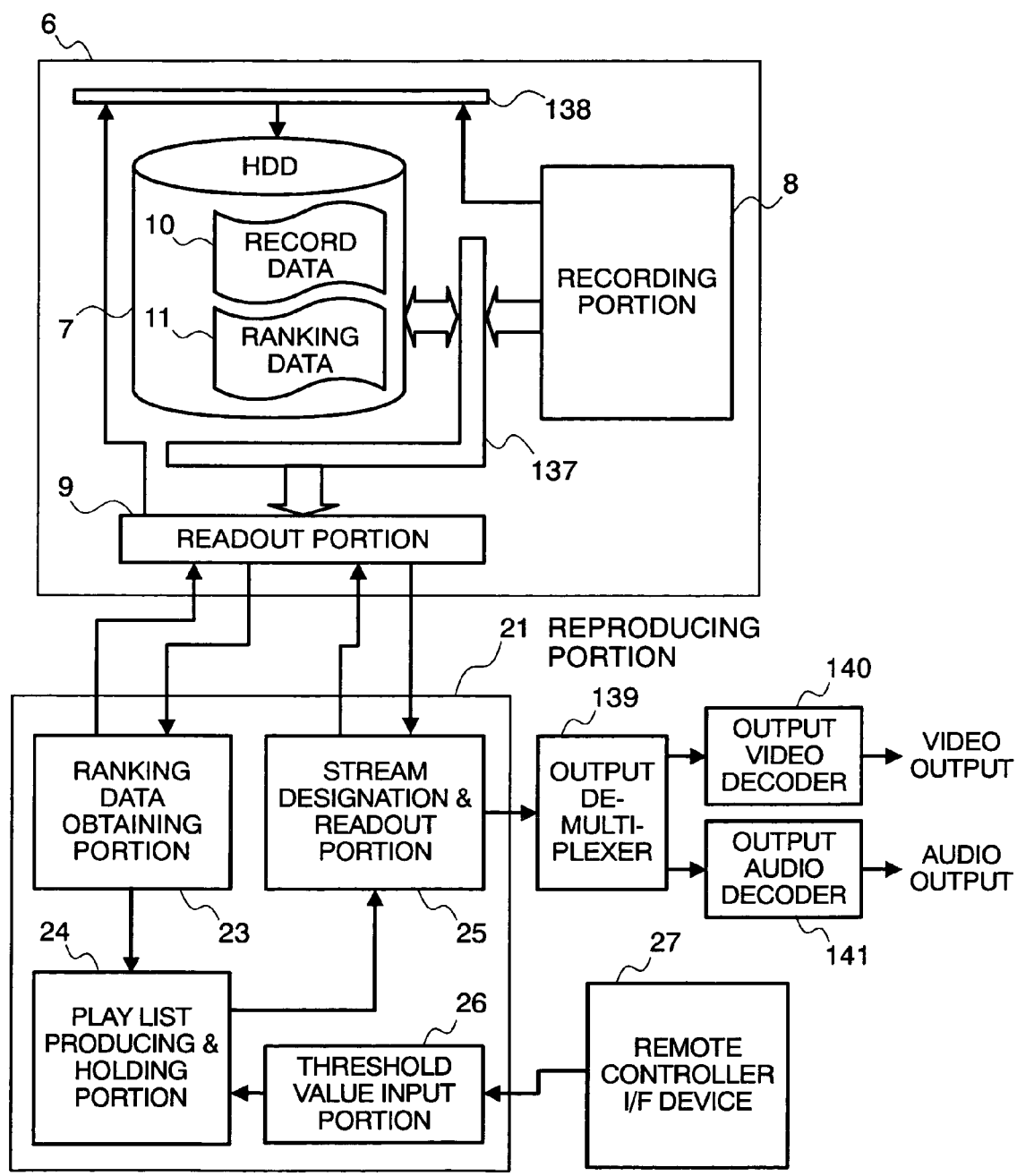
FIG. 2 is the structure view of a reproducing portion of the video recording/reproducing apparatus for analogue television broadcast (FIG. 1)

Next, explanation will be made on a reproducing portion 21 shown in FIG. 1, by referring to FIG. 2.

A ranking data obtaining portion 23 makes a request of reading out a file of the ranking data of the record data 10 to be reproduced, to the hard disk readout portion 9 of the hard disk device 6, and thereby obtaining the ranking data 11. In this instance, the hard disk readout portion 9 reads out the file of ranking data from the hard disk drive 7, and it transfer it to the ranking data obtaining portion 23. Within a play list producing and holding portion 24, a play list (see FIG. 4) is produced and held therein, in accordance with the ranking data from the ranking data obtaining portion 23 and a threshold value from a threshold input portion 26. The threshold input portion 26 obtain a threshold value which is designated by the viewer designates, from a remote controller interface 27, to be supplied to the play list producing and holding portion 24.

Information of the play list is outputted to a stream designate and readout portion 25. The stream designate and readout portion 25 requests record data of the stream of an object to be reproduced, to the hard disk readout portion 9. In this instance, it designates a start point and an endpoint of a reproducing section, which can be defined by the play list. The reproducing section is a part of the stream, and is an assembly or aggregation of continuous frames, starting from a certain frame number "Fs" (the start point) reaching to a certain frame number "Fe" (the endpoint). A part of the readout stream, streams of the reproducing section are outputted from the reproducing portion 021 to an output de-multiplexer 139.

The output de-multiplexer 139, receiving the streams of the reproducing section therein, divides them into the video ES and the audio ES, thereby to be inputted into an output video decoder 140 and an output audio decoder 141, respectively. The output video decoder 140 outputs an analog video signal of the picture to be produced, and the output audio decoder 141 outputs an analog audio signal. Supplying them to a television receiver enables to reproduce the video of the reproducing section.

Explanation will be made on a manner of determining the reproducing section(s), by means of the ranking data and the threshold value, which the viewer designates. The ranking data is a list of the ranking values, which are to be assigned to each of the frames, respectively, as was mentioned above. Those aligned in the order of the frame numbers and made up in the form of a graph result into a ranking value graph, as is shown in an upper portion of FIG. 3. A frame count on the vertical axis indicates the frame number. Since the frame number increases in a manner of time sequence, then this responds to the time-period from a start of reproduction.

It is a reproducing schedule (i.e., the threshold value "A") 29, indicating in which manner the part to be reproduced is selected within the stream, when the viewer designates a threshold value "A". On the ranking value graph 28, an object of reproduction is made on the section including the frame(s) therein, the ranking value of which exceeds the threshold value "A". In this example, selection is made on the reproducing sections 33, 34 and 35. Since the ranking value presents the importance degree of the video frame, then it can be said that the reproducing sections 33, 34 and 35 are important parts of the original video stream. Thus, continuous reproduction of only the reproducing sections 33, 34 and 35 enables for the viewer to see the abridgement (or, the digest) of the original video stream. The ranking data is inputted from the ranking data obtaining portion 23 to the play list producing and holding portion 24. Also, the threshold values are inputted from the threshold input portion 26 to the play list producing and holding portion 24. Within the play list producing and holding portion 24, comparison is made between the ranking data and the threshold value, for each of the frames.

Also, it is a reproducing schedule (i.e., the threshold value "B") 30, indicating in which manner the part to be reproduced is selected within the stream, when the viewer designates a threshold value "B". An object of reproduction is made on the section including the frame(s) therein, the ranking value of which exceeds the threshold value "B". Into the original stream is inserted CM, and in this example, there are included a section 31 of CM1 and a section 32 of CM2. Since the threshold value "B" is smaller than the threshold value "A", then the number of the reproducing sections to be selected or the length of the reproducing sections may be increased. In case of the threshold value "A", the reproducing section 36 includes the reproducing section 33 therein, and the length of the reproducing section is increased. In the similar manner, the reproducing sections 38 and 39 include the reproducing sections 34 and 35 therein, in case of the threshold value "A", and the length of the reproducing sections is increased. Also, there is newly increased a reproducing section 37, which did not appear in case of the threshold value "A". In summary, in case of the threshold value "B", the reproduction time is longer than that of the threshold value "A". Seeing this from the viewer, the threshold value "A" is stronger in the degree of abridgement while the threshold value "B" is low in the degree of abridgement. When increasing the threshold value to be much higher, the viewer can only see the scenes of high importance, in summarizing, and therefore a view time comes to be shorter, on the other hand, when lowering the threshold value, also the scenes of low importance are included therein, and therefore the view time comes to be longer, gradually.

Explanation will be given on the play list for defining the reproducing section, by referring to FIG. 4. The play list is produced within the play list producing and holding portion 24, and is held therein. The play list 40 has a stream name to be reproduced and information about the start point and the end point. The start point and the endpoint are of the frame numbers, wherein one (1) piece of reproducing section is an assembly of the continuous frames, starting from the frame number "Fs" of the start point and reaching to the frame number "Fe" of the end point. For example, an entry 44 indicates the reproducing section 33 shown in FIG. 3, and entries 45 and 46 indicate the reproducing sections 34 and 35, respectively. An entry 47 indicates an end of the play list, into the stream name column of which is stored a mark "EOS" indicative of an end of the play list.

In a system of private television broadcast, a program provider (i.e., a sponsor) provides costs or expenses for producing program, and in compensation for it, it obtains rights of inserting CM of itself into the program. In the period when the video recording/reproducing apparatuses for television broadcasts were not yet widely spread or popular, or in the period when they have a simple function, i.e., only recoding/reproducing, there could be established an assumption that a viewer of the television broadcast is a CM viewer. By the way, in recent years, improvements are made on the functions of the video recording/reproducing apparatus for television broadcast, and therefore it is possible to record the television program, but skipping away the CM portions recorded (i.e., CM cut). Also, further recently, there is provided a technology for viewing the abridgement (i.e., the digest), in general, i.e., reproducing only a portion of the program contents taking high interest. Accompany such changes in an environment of viewing, there is a possibility of collapsing such assumption, i.e., the viewer of television broadcast is the CM viewer.

Figure 3:
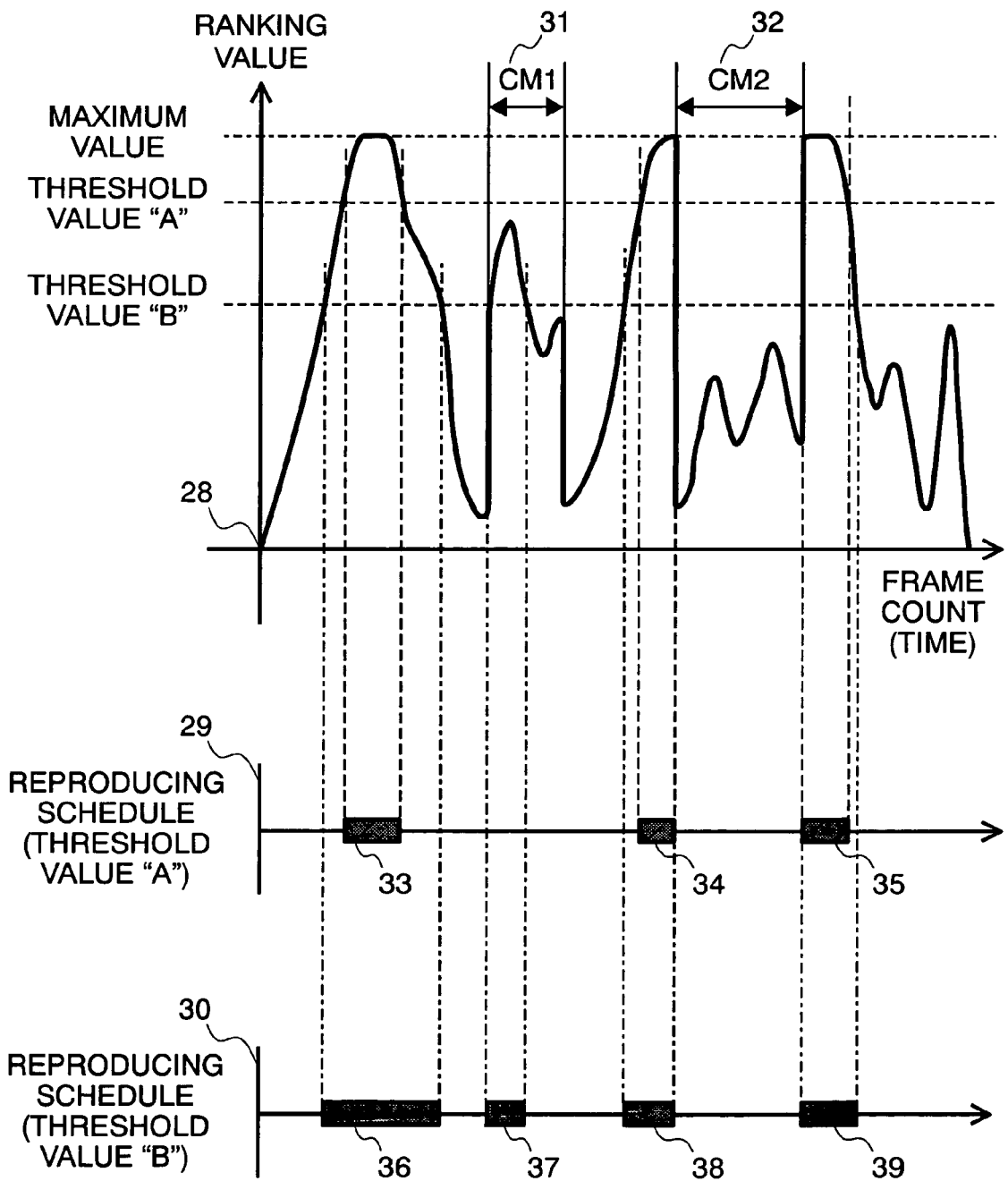
FIG. 3 is a view for explaining a ranking data graph and a reproducing schedule.

For instance, in an example of the ranking value graph 28 shown in FIG. 3, in case of the threshold value "B", only a part of the section 31 of CM1 (i.e., the reproducing section 37) is reproduced. In case of the threshold value "A", the sections 31 and 32 will not be reproduced. The estimate function for calculating out the ranking value is applied also onto the CM portion, and the ranking value thereof not always takes a high value. In case where the viewer makes a request only for the contents abridged within a shorter view time (enlarging the degree of abridgement), the set value is increased of the threshold; therefore, chances of reproducing CM are reduced. In this manner, it is possible to cut out the reproduction of CM by setting up the threshold value.

Then, next, explanation will be given about a method for maintaining a chance of providing CM, even in case when the viewer applies the function for producing the abridgement (i.e., digest), by referring to FIG. 5.

When the stream ends, readout of the ranking data is started by means of the ranking data composer portion, from the ranking data producing and holding portion 18, as well as, the CM-use ranking data producing and holding portion 19. The graph 28 shown in FIG. 5 is presentation of the ranking data in the form of a graph, which is held within the ranking data producing and holding portion 18 when starting the readout. The graph 48 shown in FIG. 5 is presentation of the CM-use ranking data in the form of a graph, which is held within the CM-use ranking data producing and holding portion 19 when starting the readout.

The CM-use ranking data shown in the graph 48 can be obtained by putting the maximum value into the ranking value for the frame, which is detected to be CM by means of the CM detector portion 17, and putting "0" into portions other than CM.

Figures 18, 19:
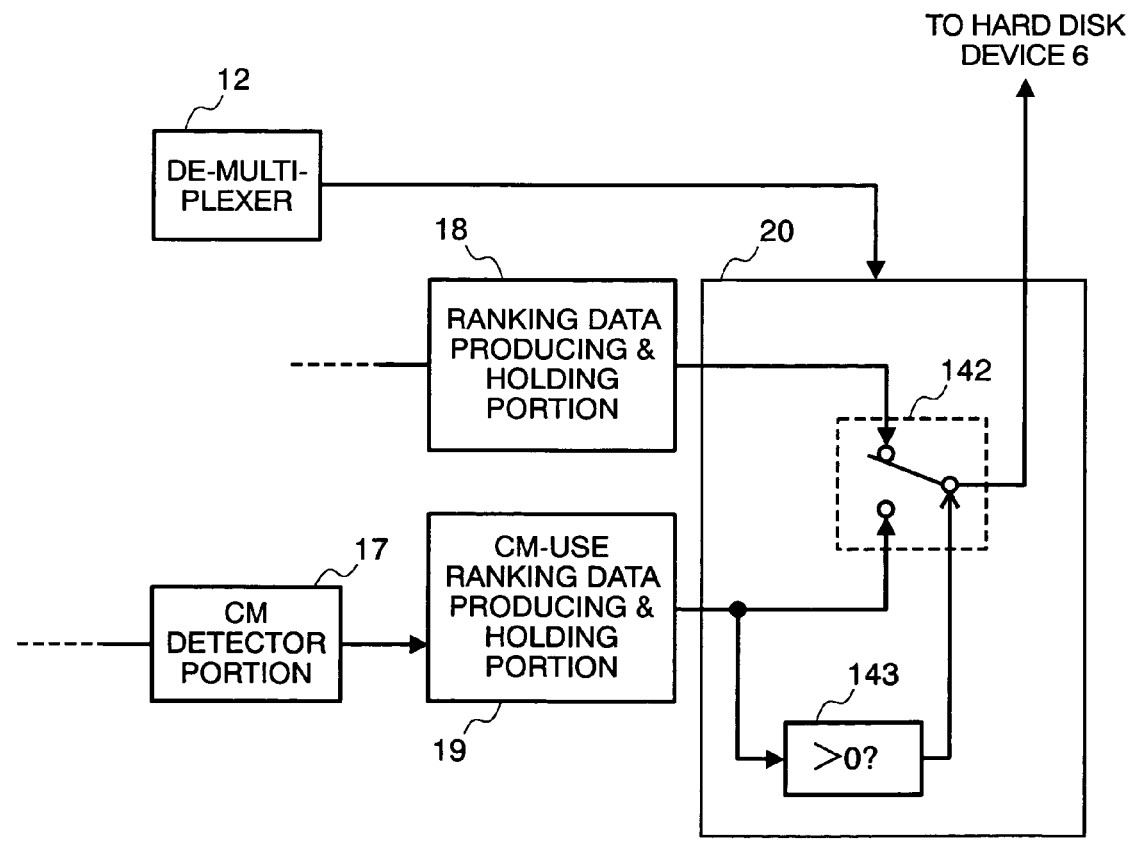
FIG. 18 is a view for explaining a CM database.
FIG. 19 is the structure view of an inside of a ranking data composer portion.

The ranking data composer portion 20, as was explained by referring to FIG. 19, composes the ranking data and the CM-use ranking data in the order of the frames. In case when the CM-use ranking data is "0", selection is made on the ranking value obtainable from the ranking data producing and holding portion 18, but otherwise, selection is made on the ranking value from the CM-use ranking data producing and holding portion 19 (i.e., the maximum value in this case).

Figure 6:
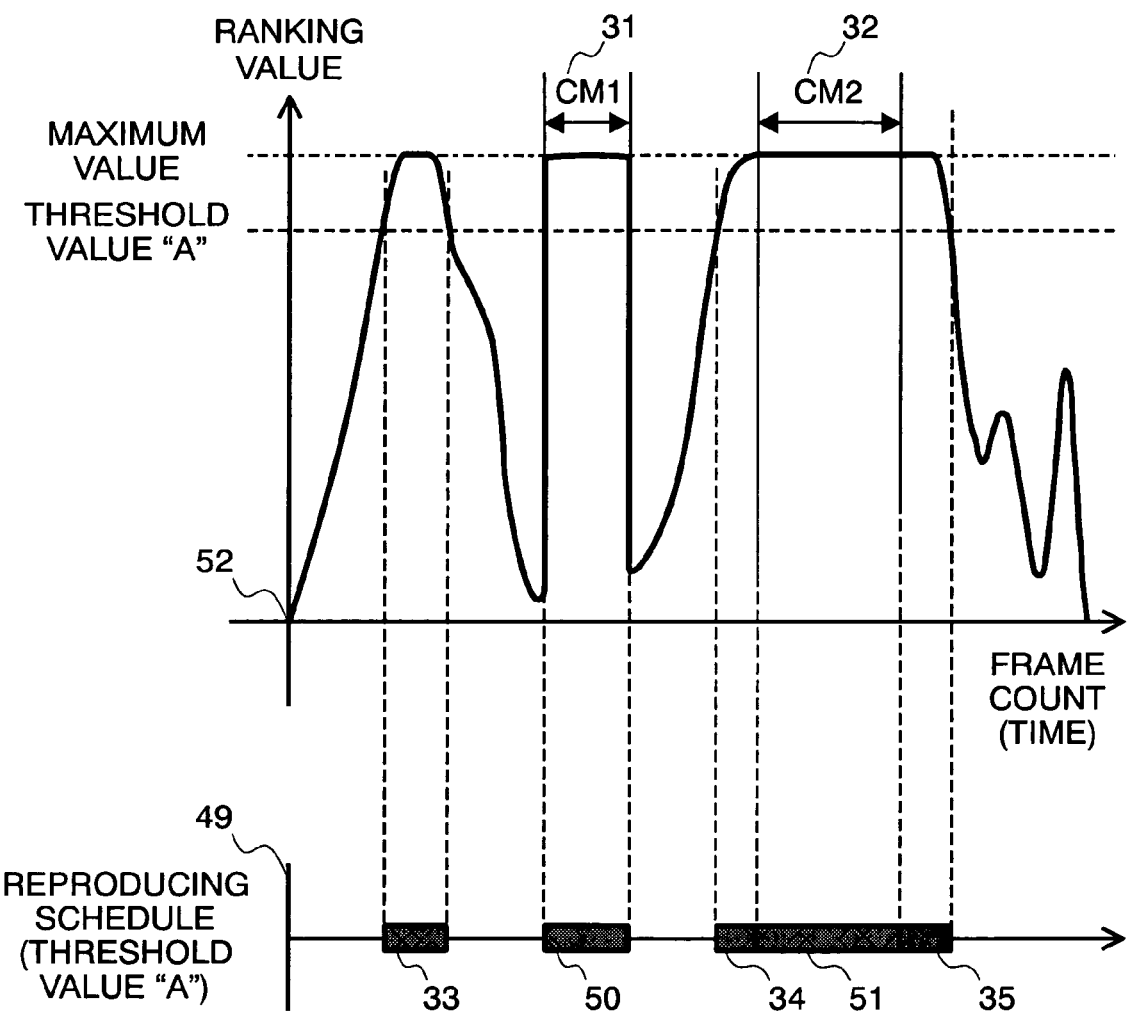
FIG. 6 is a view for explaining a ranking data graph and a reproducing schedule, which are composed.

A graph 52 of the ranking values, which are composed in this manner, is shown in FIG. 6. The ranking values of the CM sections 31 and 32 are at the maximum value. The ranking data after composition, which is shown in the graph 52 is transferred to hard disk device 6, to be recorded as the ranking data file 11.

The reproducing section to be selected when applying the threshold value "A" in this ranking data is shown on a reproducing schedule 49. The ranking values of the CM sections 31 and 32 are at the maximum value, respectively. With CM reproducing sections 50 and 51 corresponding to 31 and 32, all of the frames of which are reproduced even if the viewer tries to modify the threshold value for changing the degree of abridgement.

With such means as was mentioned above, it is possible to reproduce the entire CM inserted therein, even in case when the viewer sees the abridgement of program contents, thereby enabling to keep the chances for providing CM.

On the other hand, the viewer conducts reproduction of the abridgement for viewing only the important scenes within a shot time, however all of the frames are reproduced, in relation to CM, even if she/he tries to change the threshold value up to the maximum (i.e., at the maximum degree of abridgement). The method mentioned above is preferable for the program provider, in particular, from a viewpoint of maintaining the chances for providing CM, however it is undesired for the viewer who conducts reproduction of the abridgement. For example, in case when she/he wishes to view a 1 hour program with inserting 8 minutes CM therein, abridging them into about 10 minutes, reproduction is made on the entire 8 minutes for CM, but viewing can be made only for about 2 minutes upon the essential portion of the program contents. Thus, this loses an advantage of reproduction of the abridgement (digest) that the viewer wishes to have.

Explanation will be made on an example, for attempting to dissolve such problem, by an operation of the CM-use ranking data, by referring to FIG. 7. The ranking value graph 28 shown in an upper portion of FIG. 7 is the same as was shown in FIG. 5. The CM-use ranking graph 53 differs from FIG. 5, in particular, in the CM-use ranking data corresponding to the CM sections 31 and 32. Thus, the value increases in proportion to a frame count, from a value indicated as a level for all CM display up to the maximum value. Herein, the all CM display level is a threshold value, which takes a value between "0" and the maximum value of ranking values. The value of this threshold is fixed, and it is set up when the apparatus is manufactured, but it cannot be changed thereafter. Herein, it is presented by the name "CAD". The number of frames taking the maximum value is fixed among the CM, and it is set up when the apparatus is manufactured, but it cannot be changed thereafter. Herein, for example, those are 30 frames at the end of the CM section.

Explanation will be made on the method for producing the CM-use ranking data, which is shown on the CM-use ranking value graph 53. This is calculated out upon basis of the CM-use ranking data, which is held within the CM-use ranking data producing and holding portion 19. When the CM section starts among the streams, a signal indicative of CM is outputted from the CM detector portion 17 to the CM-use ranking data producing and holding portion 19. The frame number at that time is memorized as "CMS". For the frame, being "CMS" in the frame number thereof, the value of the all CM display level (threshold value) is set up, as the ranking value thereof. Thereafter, for a plural number of frames, the signals indicative of CM are outputted from the CM detector portion 17, but the ranking values of them are left to be undetermined. When the frame other than CM appears, again, after finishing the CM section, a value is memorized as "CME", which is obtained by subtracting "1" from the frame number of that frame, and then calculation is started of the ranking value for the CM section just before. First, the maximum value of ranking values is set into the frames, starting from $(CME-30+1)^{th}$ frame to $CME^{th}$ frame. Next, for the frames starting from $(CMS+1)^{th}$ frame to $(CME-30)^{th}$ frame, calculation is made so that the respective ranking values simply increase from CAD towards the maximum value, thereby setting up them.

Graph 54 in FIG. 54 is for the ranking data of composing 28 and 53 in FIG. 7. The composition of the ranking data is conducted with using the method, which was explained by referring to FIG. 19. The frames belonging to the CM sections 31 and 32 take the CM-use ranking values, and other frames take the ranking values of the ranking value graph 28.

The reproducing sections to be selected when applying the threshold value "A" into the composed ranking value data 54 are shown on a reproducing schedule 55. The reproducing sections 33, 34 and 35 are same to the reproducing schedule 29 shown in FIG. 3. A reference numeral 56 depicts the reproducing section of CM1, and 57 the reproducing section of CM2. In relation to reproduction of CM, reproduction is made only apart of frames at the last portion of each CM. In case when setting the threshold at the maximum value thereof, provisionally, reproduction is made on the last 30 frames for both CM1 and CM2. In this example, since the CM-use ranking values of the last 30 frames are set at the maximum value.

Also, the reproducing sections to be selected, when applying a threshold value "C" for lowering the all CM display level in FIG. 7, are shown on a reproducing schedule 58. Reproducing sections of the program contents are depicted with reference numerals 59, 61, 63 and 64. A reference numeral 60 depicts the reproducing section of CM1, and all of the CM1 are reproduced. A reference numeral 62 depicts the reproducing section of CM2, and all of the CM2 are reproduced.

In this manner, in case where the threshold value is lower than the all CM display level, all of the frames of CM are reproduced. Also, in case where the threshold value exceeds the all CM display level, the number of the frames of CM to be reproduced is reduced every time when the threshold value grows up to be large, however the last 30 frames of CM are reproduced even when the threshold takes the maximum value. Reproduction time of CM is shortened depending on the degree of abridgement, which is designated by the viewer through the setup of the threshold value, but at least a part of CM can be reproduced, even if setting the degree of abridgement at the maximum.

Figure 8:
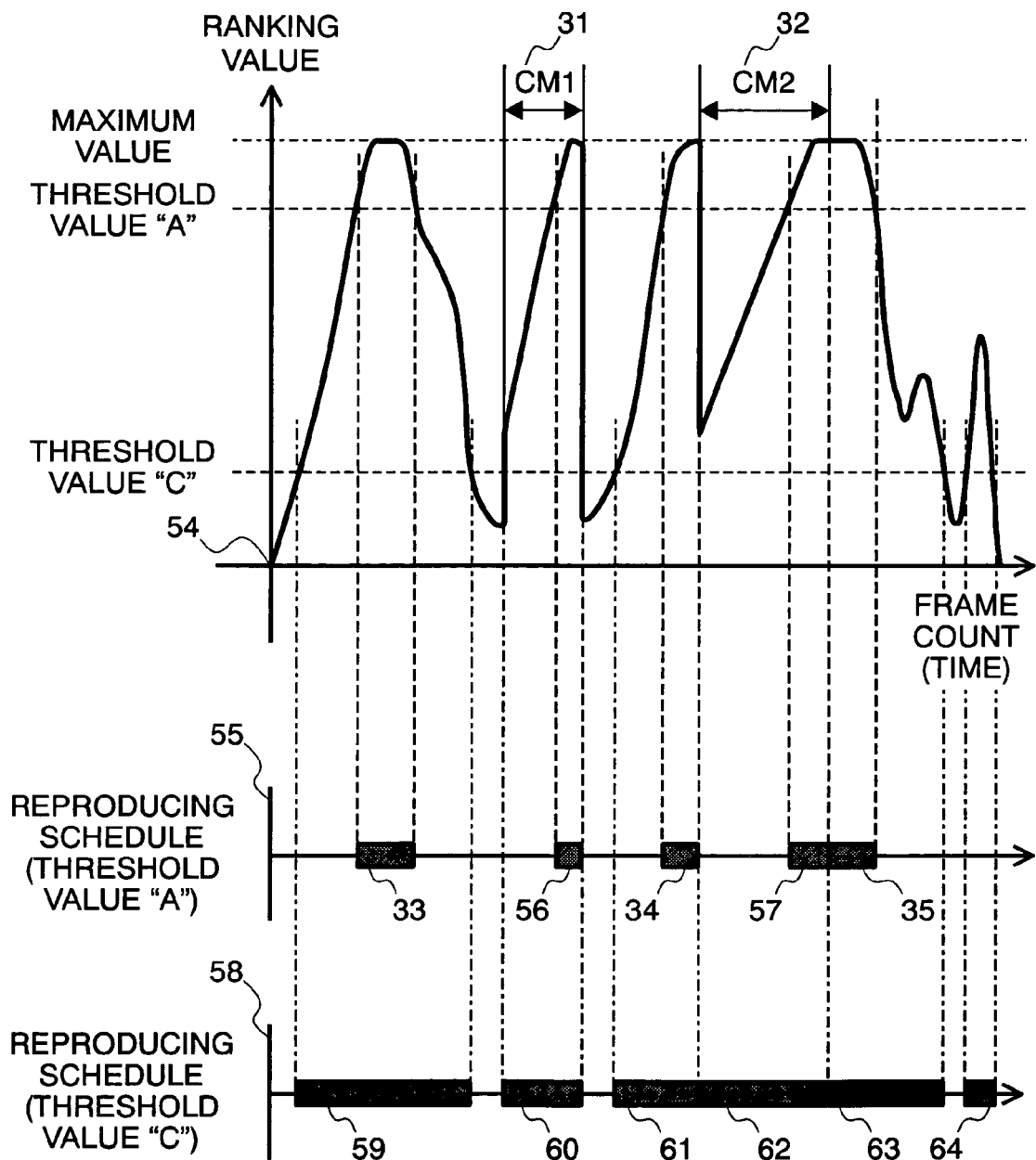
FIG. 8 is a view for explaining a ranking graph and a reproducing schedule, which are composed.

In the examples shown in FIGS. 7 and 8, the ranking values are distributed or assigned to the sections 31 and 32, irrespective of the characteristics of the video frames and the audio frames, as is shown by the CM ranking value data 53.

Figure 9:
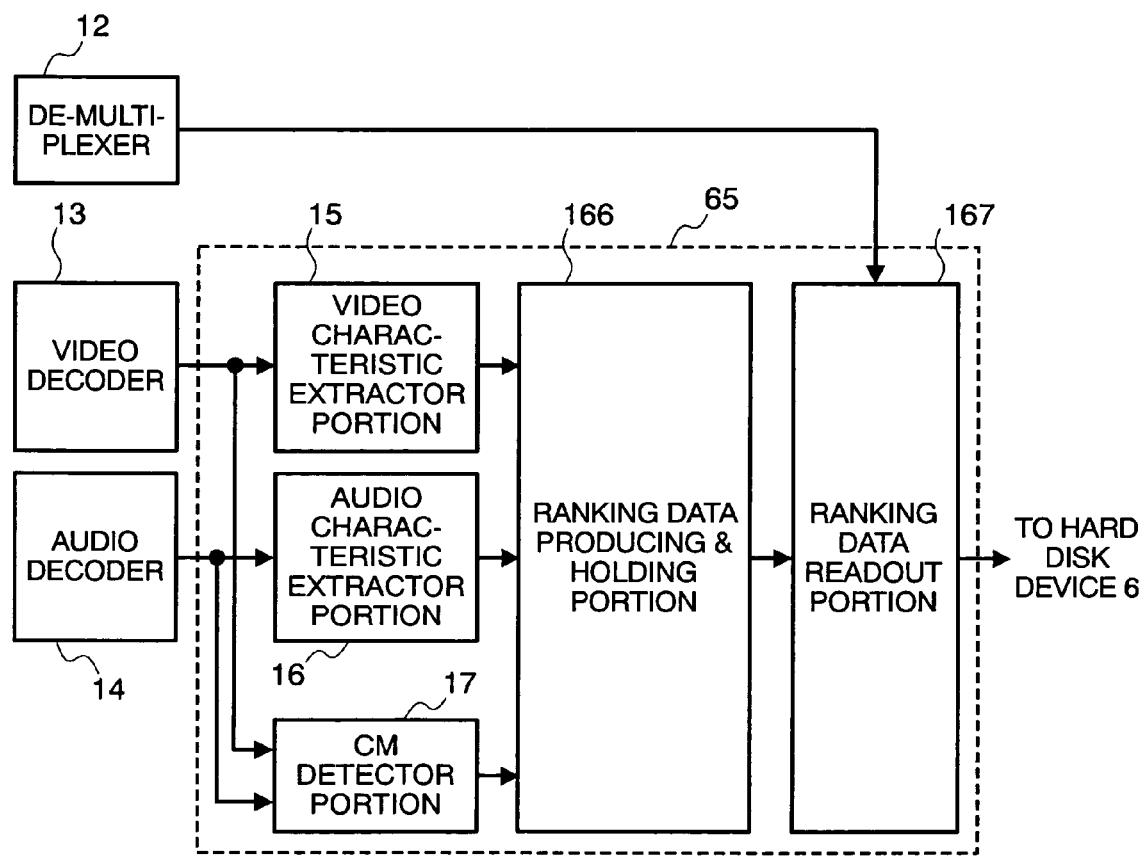
FIG. 9 is the structure view of a video estimation portion for making an abridgement or digest of CM.

Next, the structures are shown in FIG. 9, incase when applying an unique estimate function also into the CM sections.

A video estimate portion 65 comprises a video characteristic extractor portion 15, an audio characteristic extractor portion 16, a ranking data producing and holding portion 166, a CM detector portion 17, and a ranking data readout portion 167. The video signal from the video decoder 13 is inputted into the video characteristic extractor portion 15 and the CM detector portion 17. The audio signal from the audio decoder 14 is inputted into the audio characteristic extractor portion 16 and the CM detector portion 17. Differing from the video estimate portion 22 shown in FIG. 1, the signal from the CM detector portion 17 is supplied into a ranking data producing and holding portion 166. A ranking data readout portion 167 does not have such function of composing the ranking data as the ranking data composer shown in FIG. 1. Thus, upon receipt of the signal indicative of an end of the stream from the de-multiplexer 12, it reads out the ranking data from the ranking data producing and holding portion 166, successively, and thereby to store them into the hard disk device 6 in the form of a file thereof.

Figure 10:
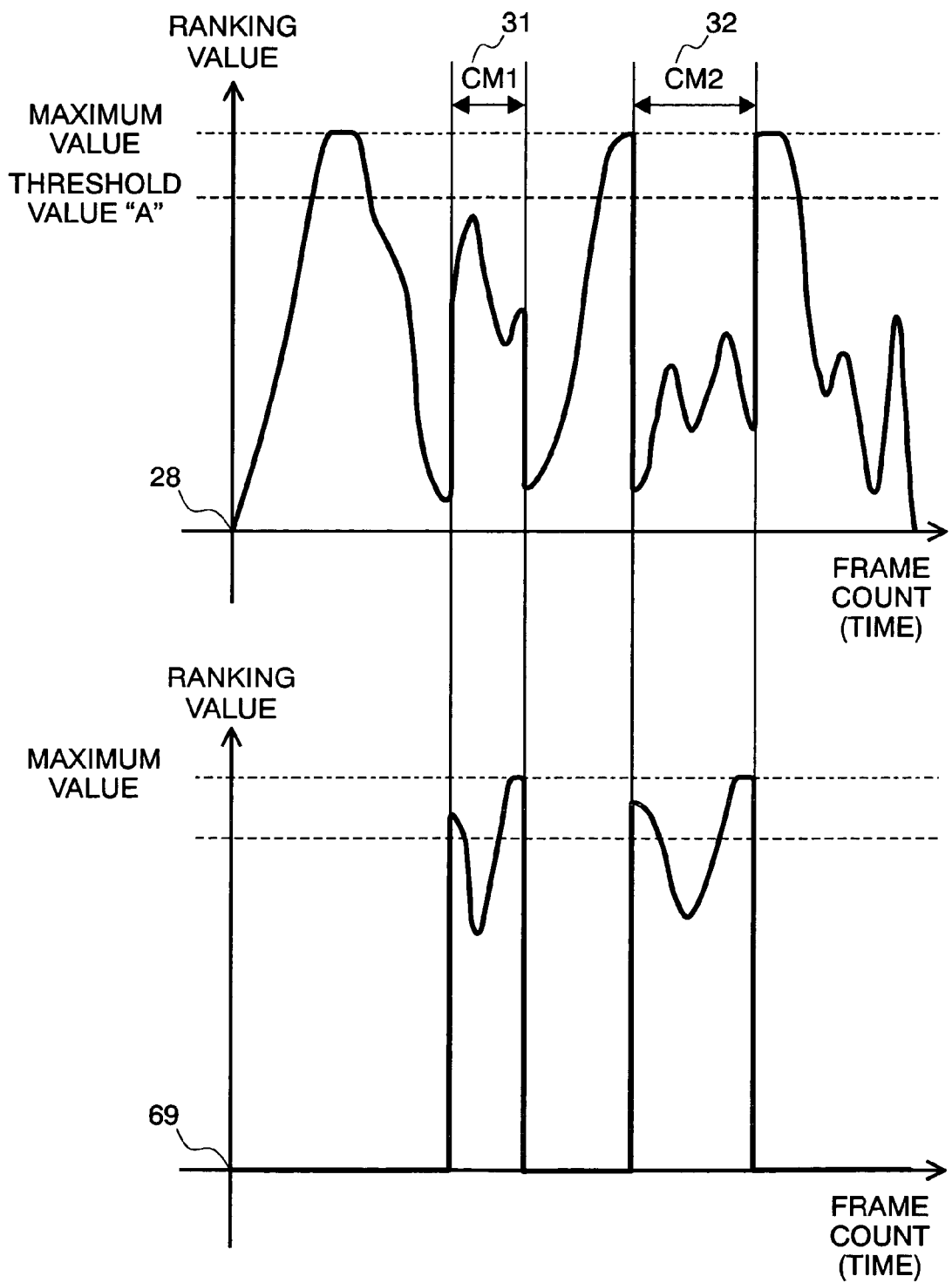
FIG. 10 is a view for explaining the ranking data graph and the reproducing schedule, in particular, when abridging CM with using a CM estimation function.

Graph in an upper portion of FIG. 10 is same to the ranking value graph 28 shown in FIG. 3. On this graph 28, the estimate function, which is applied to the frames of program contents other than CM, is also applied onto the CM sections 31 and 32.

On the contrary to that, a unique CM-use estimate function is applied to the CM sections, with the structures shown in FIG. 9. The ranking data producing and holding portion 166 shown in FIG. 9 receives the parameters, "M", "N" and "L" from the video characteristic extractor 15, in the similar manner to that as was explained on the ranking data producing and holding portion 18 shown in FIG. 1, and calculates out a parameter "S" indicative of a frequency of scene changes. It also receives a parameter "V" from the audio characteristic extractor 16. And also, it receives a signal indicative of whether the frame is CM or not, from the CM detector portion 17. The ranking data producing and holding portion 166 calculates the ranking value in the similar manner as the ranking data producing and holding portion 18, by the following equation:

$$\alpha \times M + \beta \times N + \gamma \times L + \delta \times S + \epsilon \times V \qquad \text{(Eq. 2)}$$

where $\alpha$, $\beta$, $\gamma$, $\delta$ and $\epsilon$ are coefficients.

Difference between FIG. 1 and FIG. 9 lies in that the ranking data producing and holding portion 166 exchanges a set of those coefficients, $\alpha$, $\beta$, $\gamma$, $\delta$ and $\epsilon$ in the equation mentioned above, depending on the signal from the CM detector portion 17. It is assumed that the set of coefficients is ($\alpha 1$, $\beta 1$, $\gamma 1$, $\delta 1$ and $\epsilon 1$), which is applied in the case where no signal indicative of CM is outputted from the CM detector portion 17 (i.e., in case of the frames of the program contents other than CM). It is assumed that the set of coefficients is ($\alpha 2$, $\beta 2$, $\gamma 2$, $\delta 2$ and $\epsilon 2$), which is applied in case where a signal indicative of CM is outputted from the CM detector portion 17. In this manner, the characteristics of the estimate function to be applied thereon changes, depending on whether it is CM or not.

Graph 28 shown in FIG. 10 corresponds to the graph, in case where the set of coefficients ($\alpha 1$, $\beta 1$, $\gamma 1$, $\delta 1$ and $\epsilon 1$) is also applied to the CM portion, and it comes to be the ranking data being same to the graph 28 as shown in FIG. 3. On the other hand, graph 69 is that of the ranking data of only the CM section. Although, actually, the ranking data shown by the graph 70 in FIG. 11 can be obtained, but in the graph 69 is shown the ranking data, in the case where the ranking data other than the CM section is set to be "0", for the explanation purpose thereof. The graph 69 is the ranking data in the case of applying the set of coefficients ($\alpha 2$, $\beta 2$, $\gamma 2$, $\delta 2$ and $\epsilon 2$) to the CM section.

Figure 11:
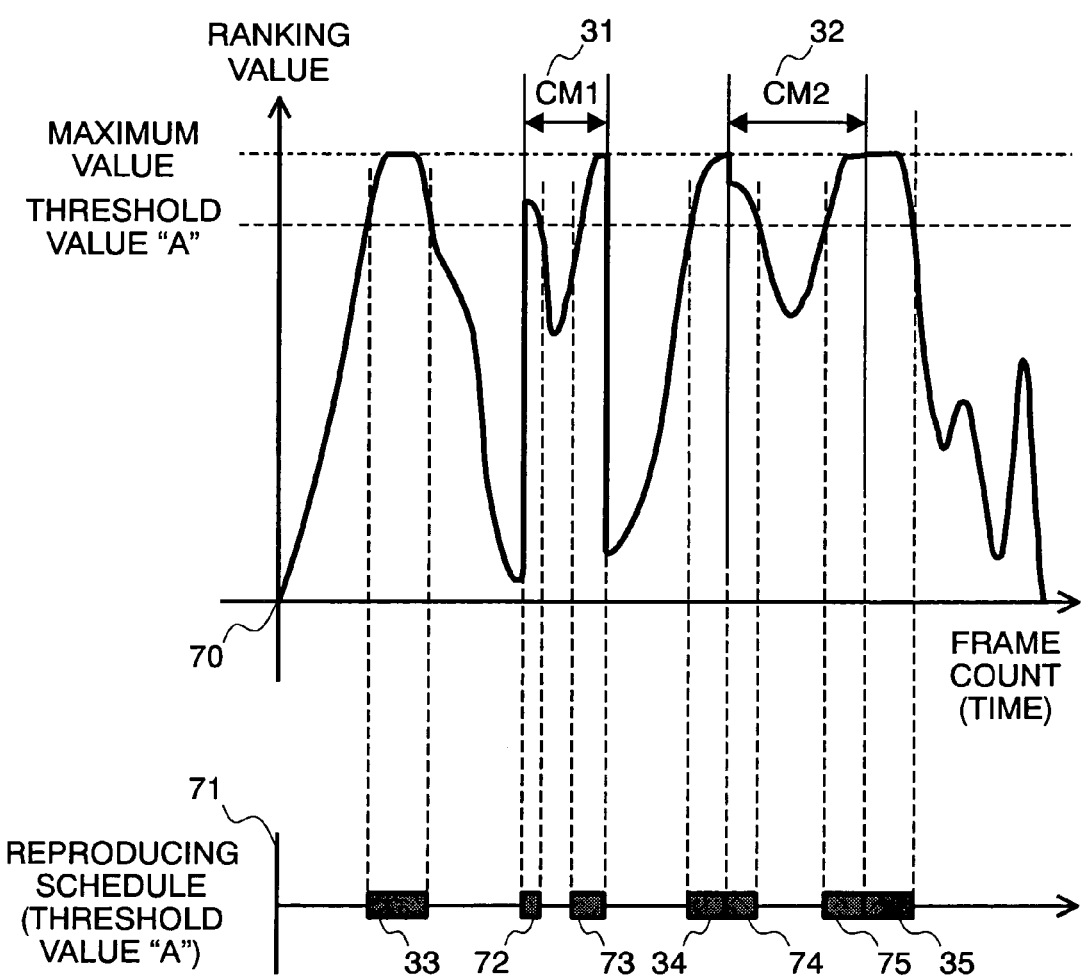
FIG. 11 is a view for explaining the ranking graph and the reproducing schedule, which are composed.

Graph 70 shown in FIG. 11 is of the ranking data, which is same to that obtained by replacing only the CM section of the graph 28 shown in FIG. 10 with the values of the graph 69. Actually, the ranking data of the graph 70 can be obtained by exchanging the set of coefficients to be applied within the ranking data producing and holding portion 166, but without composing the graph 28 and the graph 69.

On the reproducing schedule 71 is shown the reproducing section to be selected, in particular, in case when setting up the threshold value "A" into the ranking value data of the graph 70 obtained. The reproducing sections 33, 34 and 35 are same to those shown in FIG. 3 or the like. From C1 are selected the reproducing sections 72 and 73, and also from C2 the reproducing sections 74 and 75. In this manner, i.e., applying the estimate function, each having different characteristic, to CM, it is possible to achieve the abridgement (digest) reproduction of CM.

Next, an embodiment 2 of the present invention will be shown.

Figure 12:
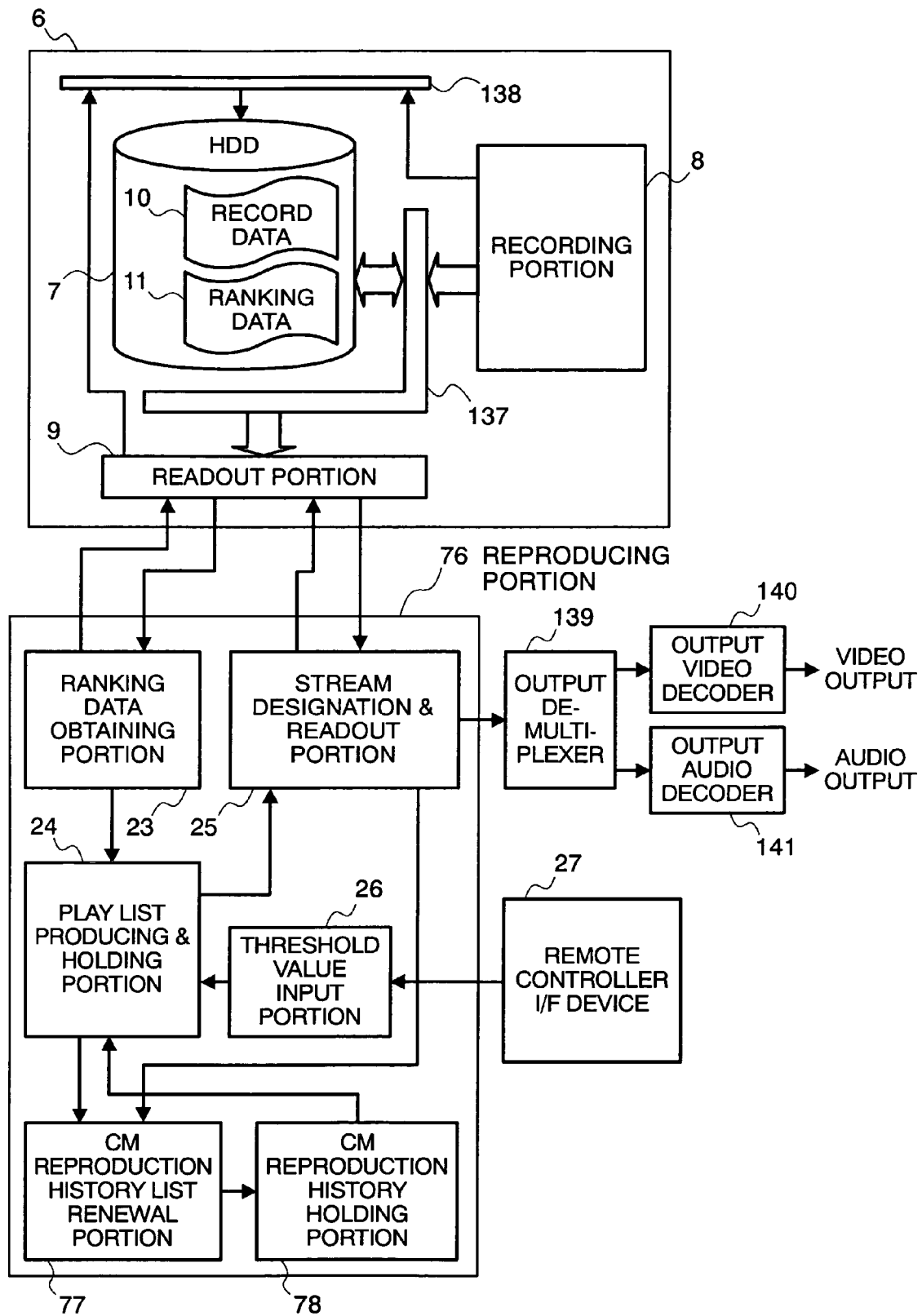
FIG. 12 is the structure view of a reproducing portion of the video recording/reproducing apparatus, for analogue television broadcast.

FIG. 12 shows a reproducing portion 76, which has a CM reproducing history list renewal portion 77 and a CM reproducing list hold portion 78, as a feature of the embodiment 2 (i.e., a combination of the CM reproducing history hold portion 77 and the CM reproducing list hold portion 78 is called "CM reproducing history control portion"). The structures of the hard disk device 6 are same to those of the first embodiment. The reproducing portion 76 has the ranking data obtaining portion 23, the play list producing and holding portion 24, the stream designation and readout portion 25, the threshold input portion 26, the CM reproducing list renewal portion 77, and the CM reproducing list hold portion 78. The play list producing and holding portion 24 has a play list therein, but the format of the play list is different from that of the embodiment 1.

Figure 23:
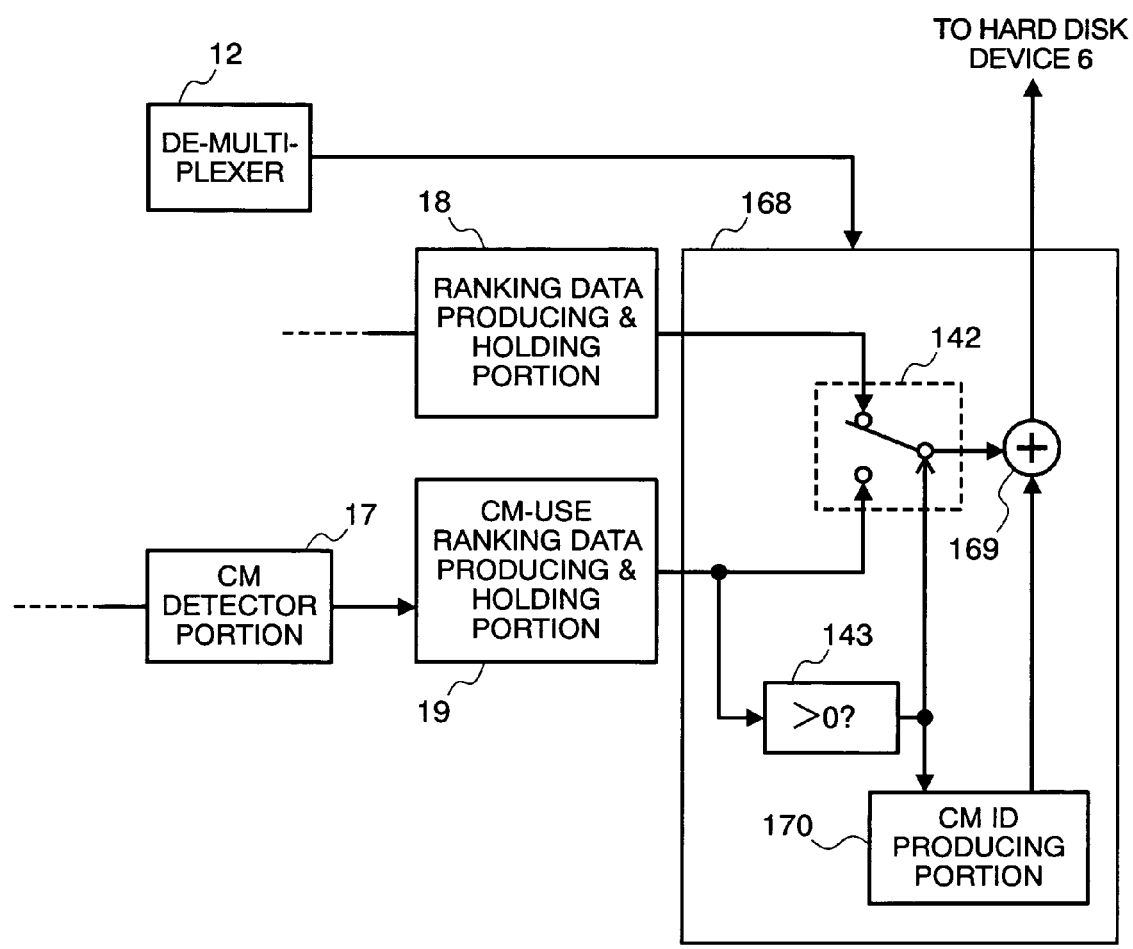
FIG. 23 shows the structure view of an inside of the ranking data composer portion.

Next, explanation will be made on the difference from the embodiment 1, in particular, when producing the ranking data therein. The ranking data composer portion 168 shown in FIG. 23 differs from the ranking data composer portion 20 shown in FIG. 1 or 19. The switch 142 and the comparator 143 have the same functions to those shown in the embodiment 1. A CMID producing portion 170 receives a logical value indicative of being the frame of CM or not, from the comparator 143. CMID is set up for each stream, and it is used for discriminating the section of CM. It is assumed CMID is in the format of, such as, CM1 or CM2, for example. The CMID producing portion 170 outputs only CMID, during when the logical value outputted from the comparator 143 is "true" (thus, during when the frame is within the CM reproducing section). After starting reproduction of the ranking data, when the logical value outputted from the comparator 143 comes to be "true" for the first time, then the CMID produce portion produces "CM1" as CMID, to be outputted to a data composer 169. During when the logical value outputted from the comparator 143 is "true", it continues to output the value "CM1", as CMID. Thereafter, when the logical value outputted from the comparator 143 comes to be "false", the output "CM1" is stopped. Next, when the logical value outputted from the comparator 143 comes to be "true", CMID is counted up to "CM2", to be outputted. Hereinafter, the processes are continued in the similar manner.

The data composer 169 composes the ranking value from the switch 142 and CMID from the CIMD produce portion 170, and it outputs such an entry of the ranking data, as is shown in FIG. 24.

FIG. 24 shows a data format in case when presenting the ranking values which are composed in the form of a table format. Explanation will be made on a ranking data format 171, with using the data therein, being same to that example of the ranking data format 158, which was explained by referring to FIG. 22. The ranking data format 171 is composed of a frame number column 172, a ranking value column 173, and a CMID column 174. On a line 175 of the ranking data is "53" in the ranking value of the frame, which has the frame number 10,000, and it indicates that this is not the frame of CM (i.e., of the program content section). On a line 176 of the ranking data is "47" in the ranking value of the frame having the frame number 19,830, and it also indicates that this is not the frame of CM. On line 177 of the ranking data has the maximum value thereof among the ranking values of the frames, each of which has the frame number 19,831, and it indicates that this is the frame of the CM section (CMID=CM1). On a line 179 of the ranking data is "65" in the ranking value of the frame, which has the frame number 20,281, and it indicates that this is not the frame of CM. After recording the stream, it is necessary to produce the ranking data before starting production of the play list.

Explanation will be made on the play list according to the embodiment 2, by referring to FIG. 13. The play list 79 has a stream name column 80, a start point column 81, and an end point column 82. The stream name is the information to be used as an ID when obtaining the record data from the hard disk device 6.

The start point and the end point are of the frame numbers. By means of the start point and the end point, designation is made on the reproducing section to be reproduced. In relation to the reproducing section of CM, the CMID (a series number, which is determined, uniquely) within the stream under reproduction is recorded into the stream name column thereof. The play list is produced upon basis of an input of the ranking data format 171. Discrimination can be made on the reproducing section of CM, with using the value of the CMID column 174 of the ranking data format 171, and further that value comes to be CMID.

Production of the play list is started after designation of the stream name, which is made by the viewer. The ranking data 11 is read out, corresponding to the stream name(s) upon abridged view of which the viewer appoints to view, from the hard disk device 6, by referring to the ranking data obtaining portion 23. The play list producing and holding portion 24 produces the play list upon basis of the ranking data 11. Into the stream name column 80 thereof is entered the stream name which the viewer designates, or the value of the CMID column 174 of the ranking data format 171. Because the name of the stream under reproduction is already known, separately, it does not matter to record CMID, in the place of the stream name. CMID is in the form, such as, CM1 or CM2, for example.

Reference numerals 83 to 89 depict the entries. Into the last entry of the play list is recorded a mark "EOS", to be the stream name, indicating the termination of the play list.

Figure 13:
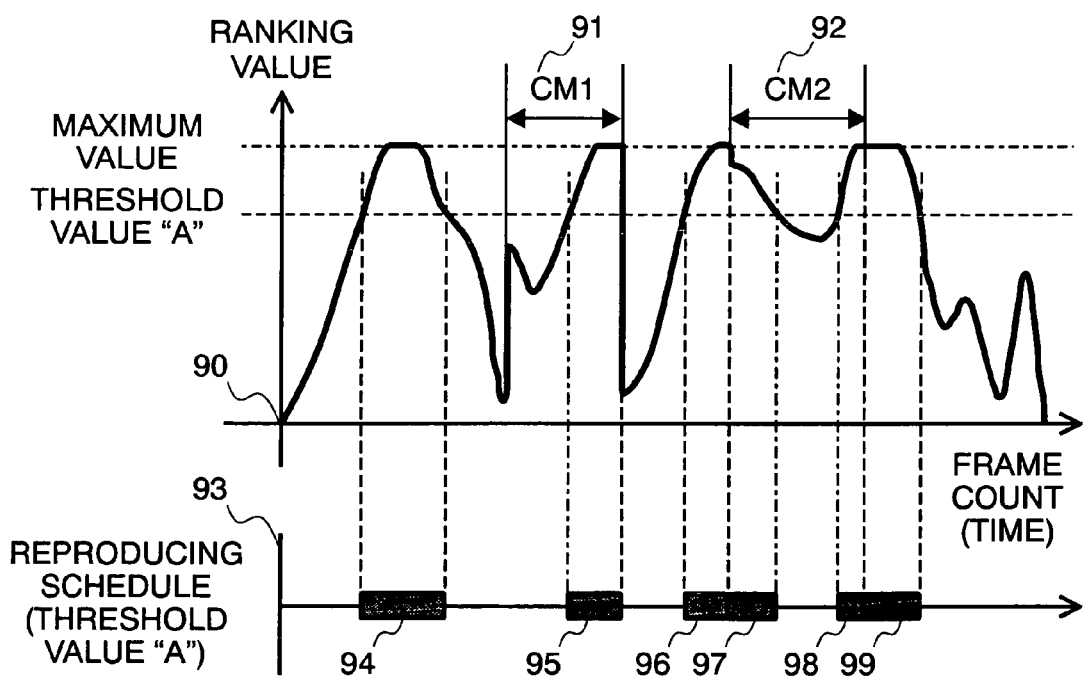
FIG. 13 is a view for explaining the play list and the ranking data graph, and the reproducing schedule, when recording a CM reproducing history.

Also, in FIG. 13 are shown a ranking value data 90 corresponding to this play list 79 and a reproducing schedule 93, in case when applying the threshold value "A" into those. It is the reproducing section 94, the ranking data of which exceeds the threshold value "A", first, and to this corresponds an entry 83 of the play list 79. The entry 83 indicates that the program reproducing section starts from the 20,000$^{th}$ frame up to 25,000$^{th}$ frame, within the frames of a program "A". The entry 84 indicates that the CM reproducing section, within which CMID is CM1, starts from the 42,700$^{th}$ frame up to 43,000$^{th}$ frame, within the stream under reproduction. A reproducing section 95 corresponds to the CM reproducing section CM1 of the entry 84.

Entries 85 and 88 are same to the entry 83. The entry 85 indicates that the program reproducing section starts from the 60,000$^{th}$ frame up to 63,000$^{th}$ frame. The reproducing section 96 corresponds to the reproducing section of the entry 85. The entry 88 indicates that the program reproducing section starts from the 80,000$^{th}$ frame up to 84,000$^{th}$ frame. The reproducing section 99 corresponds to the reproducing section of the entry 88.

The entries 86 and 87 indicating the reproducing section, within which CMID is CM2, are divided into two (2). The entry 86 indicates that CM reproducing section starts from the 69,850$^{th}$ frame up to 70,000$^{th}$ frame of CM2. The reproducing section 97 corresponds to the reproducing section of CM 2 of the entry 86. Also, the entry 87 indicates that CM reproducing section starts from the 77,910$^{th}$ frame up to 78,000$^{th}$ frame of CM2. The reproducing section 98 corresponds to the reproducing section of CM 2 of the entry 87.

In this manner, one (1) piece of CM may be divided into a plural number of CM reproducing sections, depending upon magnitudes of the CM ranking value and the threshold value. However, the frame numbers are continuous, within streams under production thereof.

Next, explanation will be given on a CM reproducing history list 100, by referring to FIG. 14.

Although the CM reproduction history list 100 is within the CM reproducing list hold portion 78, theoretically; however, actually it may be stored within the hard disk device 6. Or, it may be stored within a nonvolatile memory device, such as, a flash ROM, for example. The CM reproduction history list 100 holds therein the information about a number of times of reproducing CM within the stream, and it is composed of a record data column 101, a CMID column 102, a reproducing number of times column 103, and a count history column 104. Each of entries 105, 106 and 107 indicates that how many times that one (1) piece of CM was reproduced. On the contrary that the play list 79 can be deleted after being finished by the abstridged view of one (1) time, but for the CM reproduction history list 100, it is necessary to continue to exist thereafter. The CM reproduction history list 100 is produced for every one of the streams recorded. When deletion of made on the streams by the viewer, also the CM reproduction history list 100 is deleted.

Explanation will be given on the information within each of the columns, by referring to an example of the entry 105. The record data ID may be replaced by the stream name. It is enough that it may be the information for uniquely defining the file storing the stream therein, within the hard disk device 6. Herein, information of the stream name, "program A" is entered therein.

The CMID column 102 stores ID information therein, for uniquely identifying the CM, which is inserted into the corresponding stream. It is the information same to that of CMID shown in FIG. 13. Thus, the entry 105 results to hold therein the information relating to CM, in which CMID having the stream name "program A" is "CM1". The reproducing number of times column 103 stores therein the information of number of times thereof, i.e., how many times it is reproduced, after recording of this CM1. The count history column 104 is the information provided for inhibiting an error count from being generated, upon the CM having a plural number of the CM reproducing sections, which are divided in spite of one (1) piece of CM, like CM2 explained by referring to FIG. 13 in the above. Inhibiting of the erroneous count will be mentioned latter, by referring to FIG. 17.

Figure 15:
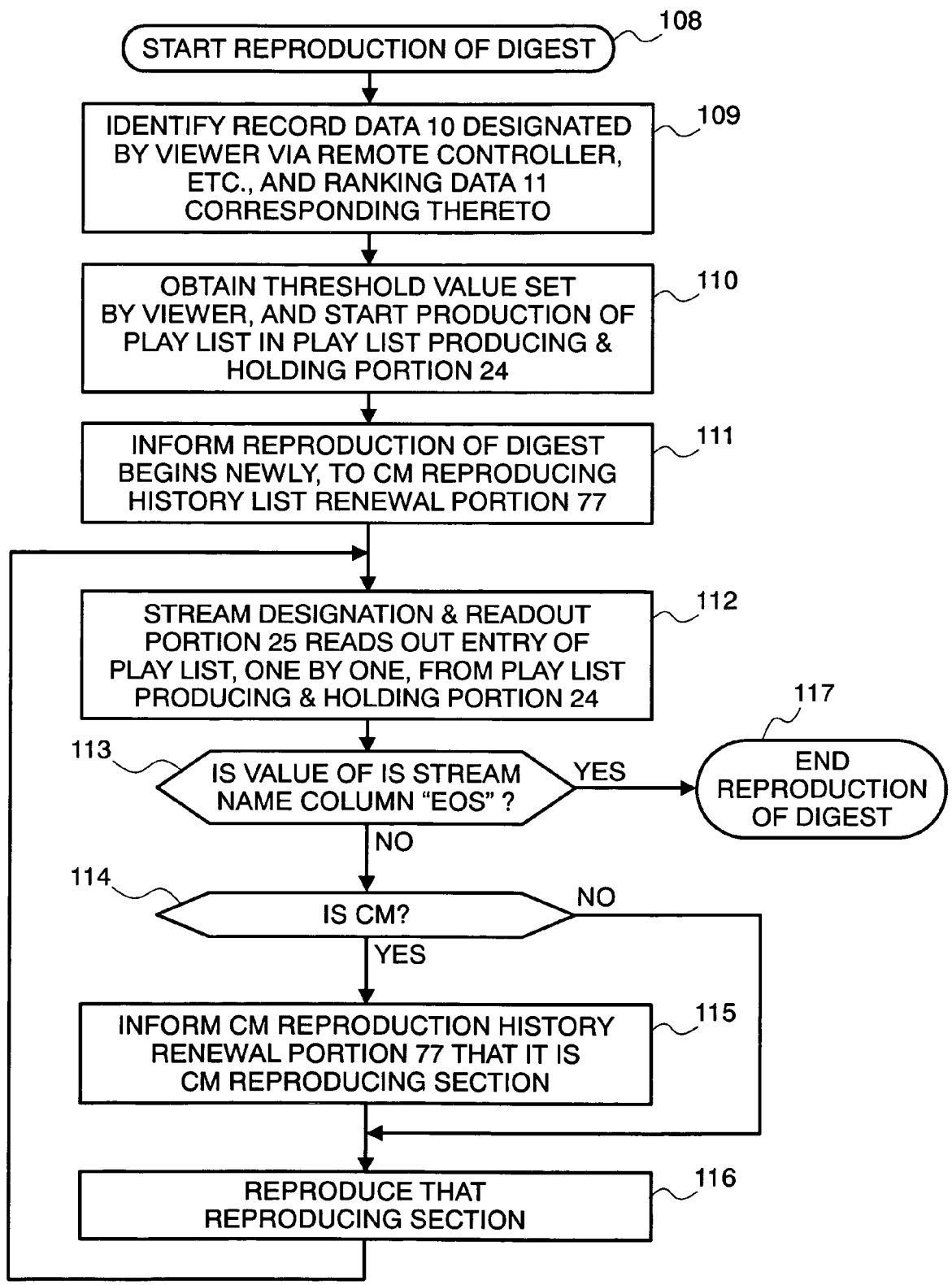
FIG. 15 is a flowchart for reproducing an abridgement accompanying with recording of the CM reproducing history.
Figure 16:
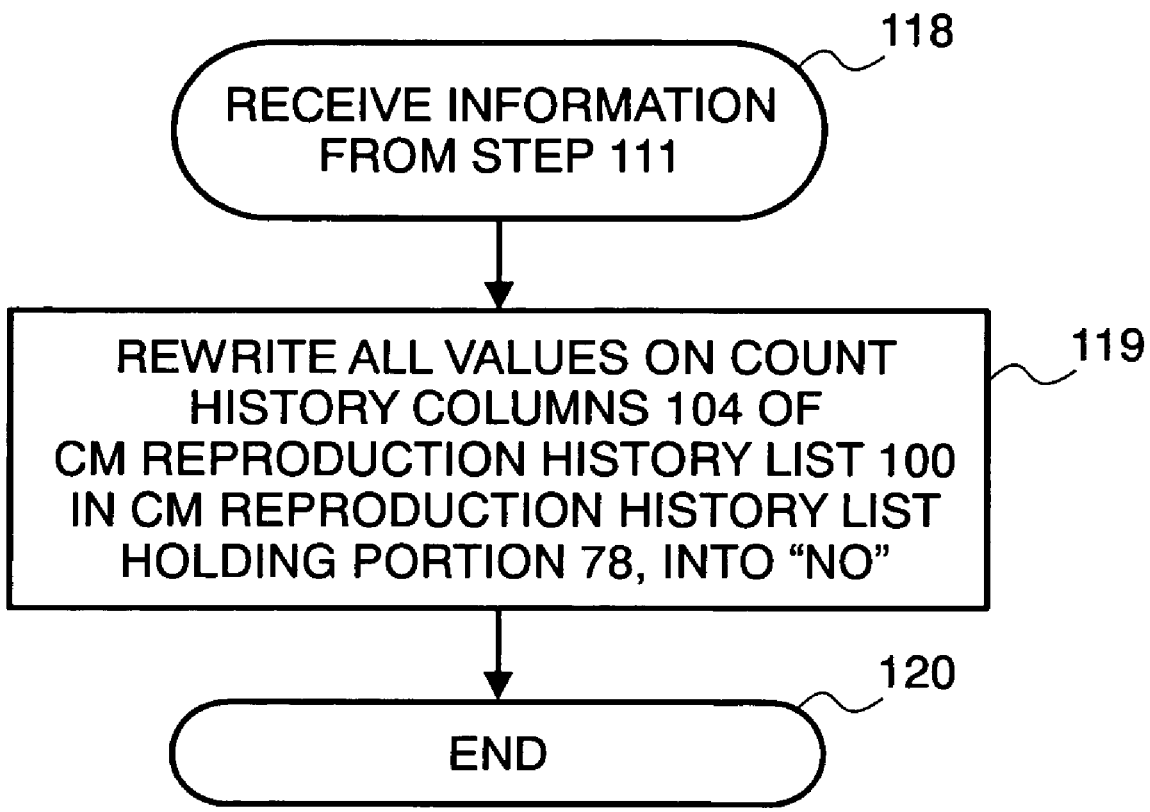
FIG. 16 is a flowchart for showing processes in a CM reproducing history list renewal portion.
Figure 17:
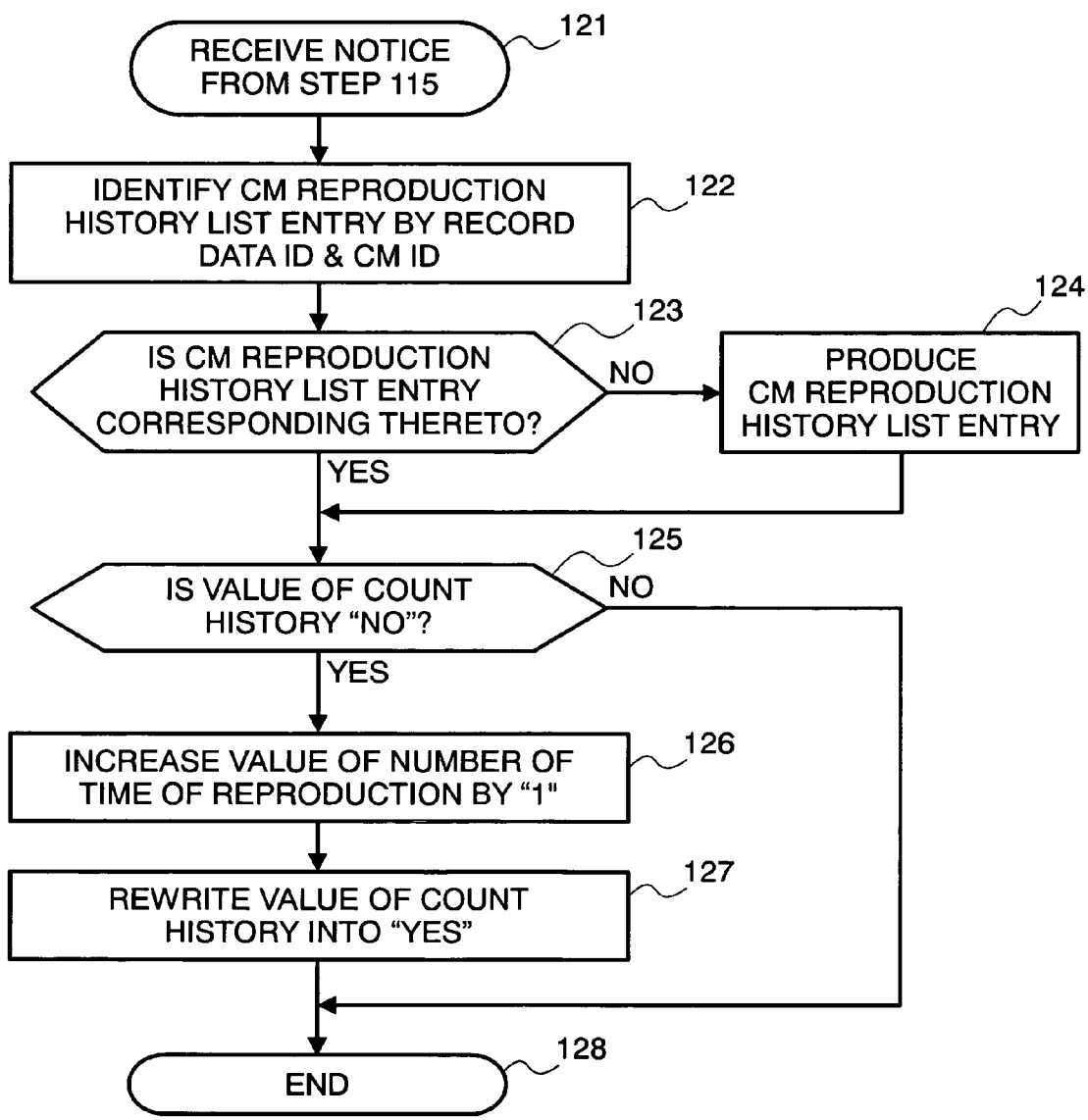
FIG. 17 is also a flowchart for showing processes in the CM reproducing history list renewal portion.

Next, explanation will be made on the method for renewing the number of times of reproducing the CM, by referring to the flowcharts shown in FIGS. 15 to 17. In a step 108 shown in FIG. 15 is started the reproduction of abridgement. In a step 109, search is made on a file of the record data 10, which is designated by the viewer, and the ranking data corresponding to that, among the files stored within the hard disk device 6, and that file is made readable. However, it is assumed that the ranking data is already produced before starting production of the play list. In a step 110, the threshold value, which the viewer sets up, is obtained from the threshold input portion 26, and production of the play list is started within the play list producing and holding portion 24, by applying that threshold value into the ranking data 11. In a step 111, it is informed to the CM reproducing list renewal portion 77 that the reproduction of abridgement is newly stared. The processes, to be conducted within the CM reproducing list renewal portion 77 upon receipt of this information, will be mentioned by referring to FIG. 16, later.

Next, in a step 112, the stream designate and readout portion reads an entry of the play list out, one by one, from the play list producing and holding portion 24. In a step 113, a test or check is made on whether the value in the stream name column of the play list entry read out is "EOS" or not. If it is "EOS", the reproduction of abridgement is ended. If it is not "EOS", a test is made on whether the value in the stream name column is CMID or not, in a step 114. If it is CMID, the process advances into a step 115, or otherwise into a step 116. In the step 115, it is informed to the CM reproducing list renewal portion 77 that it is the CM reproducing section. The processes to be conducted within the CM reproducing list renewal portion 7 upon receipt of this information, will be mentioned, by referring to FIG. 17, later. In the step 116, the stream(s) within the reproducing section is/are transferred into the output de-multiplexer 139, so as to reproduce the video therefrom. Thereafter, the process turns back to the step 112. Hereinafter, those processes are repeated until when the value in the stream name column comes to "EOS".

Explanation will be made on the processes, which are conducted within the CM reproducing list renewal portion 77 receiving the information from the step 111 shown in FIG. 15, by referring to FIG. 16. The CM reproducing list renewal portion 77, when receiving the information from the step 111, rewrites the value of the count history column 104 into "No", of the CM reproduction history list 100 within the CM reproducing list hold portion 78, for all of the entries. This value, "Yes" or "No" indicates on whether it is the CM section or not, the number of times of reproduction of which was already counted; i.e., if "Yes", it indicates that it is the CM section, the number of times of reproduction of which was already counted, while if "No", it is the CM section, the number of times of reproduction of which is not yet counted. In more details thereof will be mentioned later, by referring to FIG. 17.

The processes to be conducted upon receipt of this information from the step 111 are as was mentioned above.

Explanation will be made on the processes to be conducted within the CM reproducing list renewal portion 77, receiving the information from the step 115, which was shown in FIG. 15, by referring to FIG. 17. The CM reproducing list renewal portion 77, when receiving the information from the step 115, makes a search upon a CM reproducing history list entry corresponding thereto, among the CM reproduction history list 100, by referring to the record data ID (in this case, being same to the stream name) and the CMID, in a step 122. In a step 123, confirmation is made on whether there is the corresponding entry or not. In case where there is no corresponding entry, then the step is divided into a step 124. In the step 124 is newly produced the CM reproducing history list, and it is added into the CM reproduction history list 100.

Next, in a step 125, a check is made on whether the value in the count history column 104 is "No" or not, for the corresponding entry. In case where the value in the count history column 104 is "No", the process proceeds into a step 126. In case where the value in the count history column 104 is not "No", (i.e., in case of "Yes"), since the corresponding CM was already counted up of the production of abridgement, at this time, the process proceeds into a step 128, thereby ending the processes. In the step 126, since the corresponding CM was not counted up of the reproduction of abridgement, at this time, the value in the reproducing number of times column 103 is added or incremented by one (1). Next, in a step 127, the value in the reproducing number of times column 103 is changed from "No" into "Yes". In a step 128 are completed the processes to be conducted within the CM reproducing list renewal portion 77, upon receipt of the information from the step 115.

With the processes mentioned above, it is possible to escape from duplicated counting of the number of times of CM reproduction, in particular, when one (1) piece of CM is divided, like the CM2 within the play list 79, for example, and they are reproduced to be a plural number of CM reproducing sections.

Also, it is possible to record the number of times of reproducing CM, one by one, for each CM. For example, in case where the viewer tries to reproduce the same program recorded in summary thereof (i.e., in digest), repetitively, it is undesirable for the viewer to be oblige to see the same CM every time when it is repeated, even though CM is also reproduced in summary thereof and also the reproduction time thereof is shortened. It is considered that an obligation to see CM can be fulfilled by the viewer, if she/he sees one (1) piece of CM by five (5) times at the most, for example. According to the present embodiment, since the reproducing history of CM can be recorded within the CM reproduction history list 100, it is possible to determine on whether the CM reproducing section should be reproduced or not, by referring to the past reproducing history thereof. As an easy example, such a control is possible, that the CM will not be reproduced no more, if it was already reproduced by 5 times in the past.

When producing the play list with applying the threshold value into the ranking value data of the stream, it is also possible to apply another threshold value differing from that of the program content portion, i.e., the portion other than CM, in relation to the CM portion. Thus, if making the value of the threshold to be applied into the each CM portion as large as the number of time of reproducing that CM increases, then such a control can be achieved that the reproduction time thereof is long during when the number of times of reproduction is small, but the reproduction time comes to be short when the number of times of reproduction increases.

When producing the ranking value data, the frame number for starting CM and the frame number for ending CM are known, which are detected by the CM detector portion 17. This information will be utilized when producing the ranking data.

In the present embodiment, explanation will be made on the case where that information is reserved to be in the form of a CM database, to be utilized.

The CM database 129 is shown in FIG. 18. Into a record data ID column 130 for each of entries is entered the information, which is needed when obtaining the file, which stores the streams therein, from the hard disk device 6. This has the same meaning of the stream name. Into a "CMID" column 131 is entered the information, which can be specified or identified uniquely. Into a "start point" column 132 is entered a frame number for starting CM, while into an "end point" column 133 a frame number for ending that CM. An entry 134 indicates that CM frames, CMID of each of which is "CM1" within the stream called by "program A", start from a frame number 1,589 and reach to a frame number 2,489, among the streams of the "program A". An entry 135 indicates that CM frames, CMID of each of which is "CM2" within the stream called by "program A", start from a frame number 10,974 and reach to a frame number 11,424, among the streams of the "program A". An entry 136 indicates that CM frames, CMID of each of which is "CM3" within the stream called by "program A", start from a frame number 27,648 and reaches to a frame number 28,548, among the streams of the "program A".

The CM database 129 is stored into the hard disk device 6 or the non-volatile memory, such as, the flash ROM. It is preferable to add the information of CM sections to be the entries of the CM database 129, when producing the ranking data. Also, with the entries on the CM database 129, a part of entries corresponding thereto is removed when the record stream(s) is/are deleted. In the example shown in FIG. 18, entries 134, 135 and 136 are removed when "program A" is deleted.

There may be a case where the viewer, who saw CM reduced (or, abridged) when it is reproduced in summary, wishes to see the whole edition of that CM (i.e., under the original condition before reduction is made). For example, with provision of a push button on the remote controller, it is possible to start reproduction of the whole edition of that CM, when this push button is suppressed down. The button having such function is called by "see this CM", within the present specification. Herein, although it is achieved with provision of the push button of the remote controller, but there may be applied another method of clicking an icon or the like on a screen. This is also same to that for other operations.

When the "see this CM" button is pushed down during the reproduction of CM of reduced version, it is possible to obtain the stream name, i.e., the record data ID and CMID, from the corresponding entry of the play list 79. Thus, searching of the CM database enables to obtain the start point (i.e., the frame number) and the end point (i.e., the frame number) of the whole edition of that CM, upon basis of the said record data ID and CMID.

Thereafter, readout is made on the streams from that start point up to the end point, so that it is possible to reproduce the whole edition of that CM.

Explanation will be made about the means for achieving the functions mentioned above, by referring to FIGS. 25 and 26. A producing portion 180 in FIG. 25 corresponds to the reproducing portion 21 show in FIG. 1. The hard disk device 6 is same to that shown in FIG. 1. The producing portion 180 comprises the ranking data obtaining portion 23, the play list producing and holding portion 24, the threshold input portion 26, a stream designation and readout portion 181, and a CM operation command input portion 182. The functions of the ranking data obtaining portion 23, the play list producing and holding portion 24 and the threshold input portion 26 are same to those shown in FIG. 2. The stream designate and readout portion 181 and the CM operation command input portion 182 build up the portion differing from that. The stream designate and readout portion 181 will be mentioned later, by referring to FIG. 26 attached. The CM operation command input portion 182 receives an event, which is outputted from the remote controller interface device 27 when the viewer operates the "see this CM" button mentioned above or the like, and it supplies it to the stream designate and readout portion 181, as a command.

Figure 26:
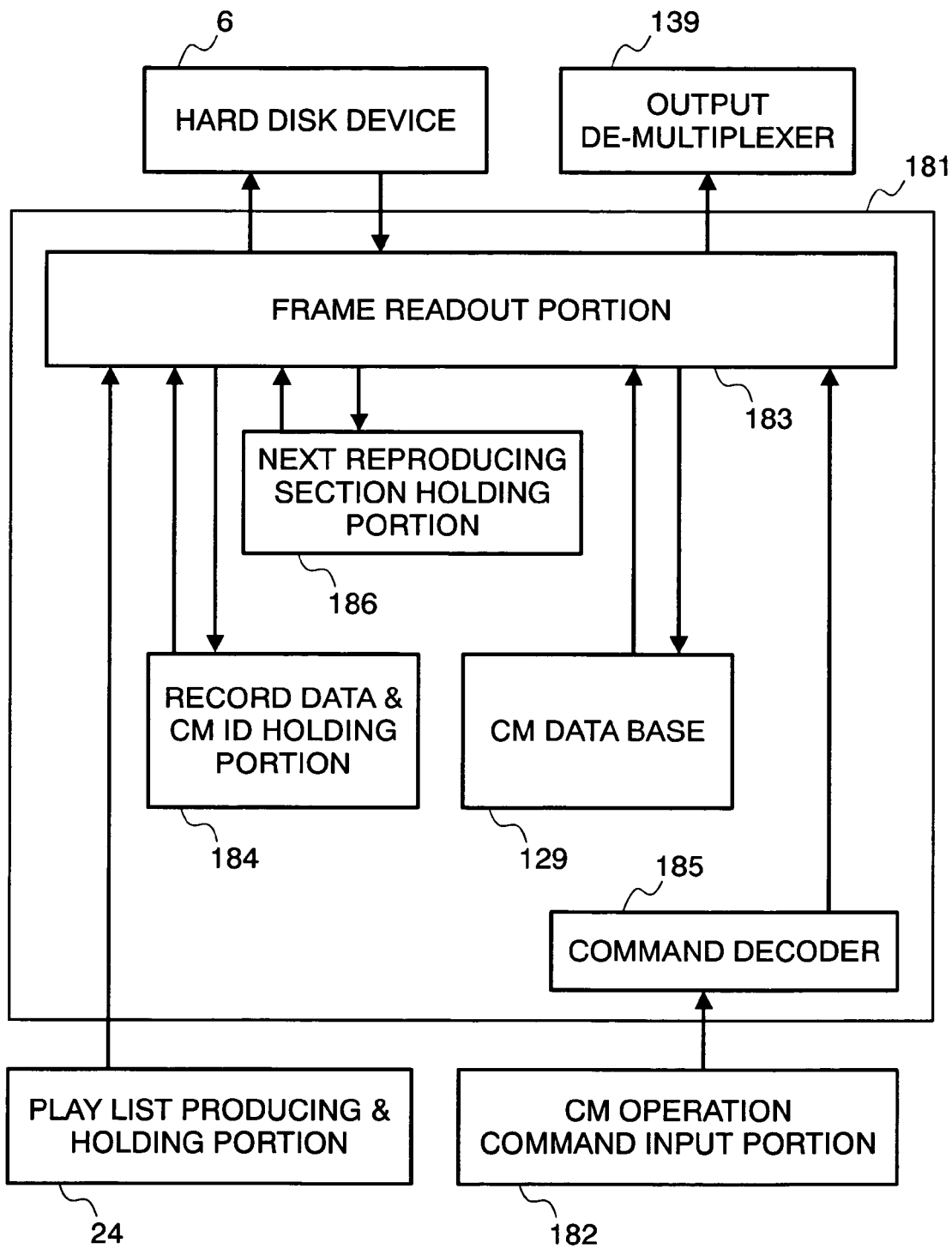
FIG. 26 shows the structure view of an inside of a stream designation and readout portion.

Explanation will be given about the internal structures and processes of the stream designate and readout portion 181, by referring to FIG. 26. The stream designation and readout portion 181 comprises a frame readout portion 183, a record data ID and CMID holding portion 184, a command decoder 185, a next reproducing section holding portion 186, and the CM database 129.

The command decoder 185 receives a command from the CM operation command input portion 182 and decodes it into a command format for an inside of the stream designation and readout portion 181. The decoded command is issued to the frame readout portion 183.

The frame readout portion 183 reads out the entry of play list within the play list producing and holding portion 24, in case of the normal abridged reproduction, in series, thereby obtaining the stream names to be reproduced, i.e., the record data ID and the frame number of the start point and the frame number of the end point of reproducing section. The record data ID is obtained from the entry of the reproducing section other than CM, within the play list 79. When reproducing the CM section, it is possible to obtain CMID from the stream name column 80 of the entry within the play list 79. In this manner, the frame readout portion 183 holds four (4) kinds of information, i.e., the record data ID, CMID (in case when reproducing CM), the start point, and the end point.

The frame readout portion 183 obtain the frame data, in series, from the frame number of the start point to the frame number of the end point, among the streams designated, together with the record data ID, from the hard disk device 6. And, it outputs the frame data to the output de-multiplexer 139.

In case where reproduction is conducted on the CM section when the "see this CM" command is issued from the command decoder 185 to the frame readout portion 183, the frame readout portion 183 operates as follows. Thus, the frame readout portion 183 obtains the information about the entry, which is located after the entry presently being under reproduction thereof and relates to the reproducing section other than CM, among the entries of the play list 79 within the play list producing and holding portion 24. The data of this entry (i.e., the stream name; such as, the record data ID, the frame number of start point, and the frame number of end point) are outputted into the next reproducing section holding portion 186. The next reproducing section holding portion 186 holds those three (3) kinds of information therein. The information held therein specifies or identifies the reproducing section other than CM, to be reproduced after completion of CM reproduction, which is presently under reproduction thereof.

The frame readout portion 183 holds four (4) kinds of information therein; i.e., the record data ID, CMID of the CM section under reproduction thereof, the start point, and the end point. Among of those, the record data ID and the CMID are outputted into the record data ID and CMID holding portion 184. The record data ID and CMID holding portion 184 holds those two (2) kinds of information therein. The frame readout portion 183 searches out the CM database 129 with using those two (2) kinds of information as keys. From the corresponding entry within the CM database 129 are obtained the frame numbers of start point and the frame number of end point of the corresponding CM, within the stream data indicated by the record data ID.

Next, the frame readout portion 183 reads out all of the frames building up the corresponding CM, in series, from the hard disk device 6, with an aid of the frame number of start point and the frame number of end point of the corresponding CM obtained, and outputs them into the output de-multiplexer 139.

After outputting all of the frame data of the corresponding CM, the frame readout portion 183 outputs the frame data of the last frame to the output de-multiplexer 139, repetitively. With this operation, it is possible to show the reproduction of the streams seeming to be paused, after reproducing the CM that the viewer designates by means of the "see this CM" button.

Under this "pause condition", the frame readout portion 183 is in the condition of waiting a command issued from the command decoder 185. In case where the viewer wishes to turn back to the abridged reproduction of the original program contents, a command indicative of re-starting of the reproduction of program is issued to the frame readout portion 183, through pushing down of the "see this CM" button of the remote controller. Upon receipt of this command, the frame readout portion 183 operates, as follows. Thus, the frame readout portion 183 starts the reproduction of the reproducing section of the stream designated, again, by using three (3) kinds of information; i.e., the record data ID, the frame number of start point and the frame number of end point, which are held within the next reproducing section holding portion 186 (i.e., the frame data are read out from the hard disk device 6, in series, to be supplied to the output de-multiplexer 139). When completing the reproduction of this reproducing section, in the similar manner to that of the normal abridged reproduction, the information about the next reproducing section is read out from the play list producing and holding portion 24, thereby continuing the normal reproduction of abridgement.

Also, if applying this mechanism therein, it is also possible to reproduce the CM, repetitively, the whole edition of which is reproduced. After reproducing the whole edition of CM through the "see this CM" button mentioned above, reproduction of the stream is paused. In this instance, the screen keeps displaying of the frame, which is displayed most recently, thereon, and it also displays a message therein, that it is under the condition of waiting an operation. And, when an instruction is made on repetitive display of CM through the operation, such as, pushing down of the "see this CM" button provided on the remote controller, the whole edition of said CM are reproduced, repetitively. Since holding the frame number of start point and the frame number of end point of the said CM therein, the frame readout portion 183 reads out all of the frames building up the said CM, in series, from the hard disk device 6, again, so as to output them to the output de-multiplexer 139. With repetition of this operation, repetitive reproduction can be conducted. During the repetitive reproduction, it is possible to slip out from the condition of repetitively reproducing the CM through operation of the "see this CM" button or the like, so as to turn back to the original reproduction of abridgement (or, digest).

With using the CM database 129, it is also possible to store the CM, which the viewer prefers, separately from the original stream, to be another independent stream, in the hard disk device 6 or the like. After conducting the "see this CM" function mentioned above, if the operation of pushdown of the "see this CM" button, etc., during the time when reproduction of the stream is paused, then a file reservation (i.e., copying) is conducted on the whole edition of said CM, to be another stream.

In the embodiment 1, the explanation was made on the method of reducing or shortening CM, but not cut off, when reproducing the abridgement, wherein the abridgement is achieved by means of applying the estimation function upon CM on the receiving side, or the like. On the other hand, the abridgement (or reduction) of CM on the receiving side, it cannot be said that it reflects an intention of a CM producer. For the CM producer, there must be a request, such as, this scene should be seen, at least, etc.

Then, according to the present embodiment, with utilizing the data broadcast, such as, digital television broadcast or the like, for example, explanation will be made on a mode of broadcasting information, accompanying CM with, as well as, said data broadcast. Within the information accompanying CM there with, there is an indication or the like, when reducing or shortening this CM.

The receiving side apparatus produces the CM-use ranking data, based on the instruction of the case when reducing or shortening said CM.

Or, alternately, it is also possible to broadcast the CM of reduced version itself, with using the data broadcast. For example, a five (5) seconds version or a three (3) seconds version may be broadcasted for the CM of fifteen (15) seconds version. The receiving side, compiling and storing those CM of reduced version therein, reproduces any one of them, substituting for the proper CM when there occurs a necessity of shortening the reproduction time of CM.

And, it is also possible to send through the data broadcast, not only the reduced version, but also CM of captioned version and/or logo-mark CM, which is displayed overlaying on the screen of the program contents, etc. Further, it is also possible to insert CM therein, not inserting the CM of reduced version between the scenes (or between the reproducing sections) of the program contents, but piling it upon the screen of the program contents, under the reproduction thereof. With this method, it is possible to present CM, naturally, for the viewer viewing the abridged reproduction.

For displaying the CM of overlaid mode, including the caption version therein, on the screen displaying the program contents thereon, there is prepared a program contents-use play list, as well as, the CM-use play list. This is because; progression of the program contents and progression of the overlaid CM are independent from each other.

Also, for the purpose of presenting CM until the end thereof, in particular, in case where an end time of reproduction by means of the CM-use play list comes after the end time of reproduction by means of the program contents-use play list, the overlaid CM is reproduced until the end thereof while keeping the display of the last frame of program contents. In this instance, when the viewer inputs a request for stopping the reproduction of program inputted, then control is made not to receive that request of stopping the reproduction, for the purpose of presenting the CM with certainty.

It is also possible to edit the play list before starting the production of abridgement. The entry of the play list is composed of a plural number of reproducing sections and a plural number of CM reproducing sections. Since abridgement of the program contents is entered into each of the reproducing sections, there is necessity of arranging or aligning them, in time sequences thereof. On the other hand, with the CM reproducing sections, in particular, those having the same CMID therein, they must be aligned in time sequences thereof; however, judging from a viewpoint of a unit of CM, the order or sequence of reproduction may be replaced with.

Also, obtaining an averaged value of the ranking values for each of the reproducing sections of the program contents, to be compare with, enables to calculate out or infer a reproducing section having high evaluation ranking thereof. The reproducing section having high evaluation ranking can be considered to be so-called a "climax" scene. And, in a front of this "climax" scene can be shifted the CM reproducing section. With such editing of the play list, the viewer can know that the "climax" scene will start soon, when reproduction of CM is continued, upon reproduction of the abridgement.

Figure 27:
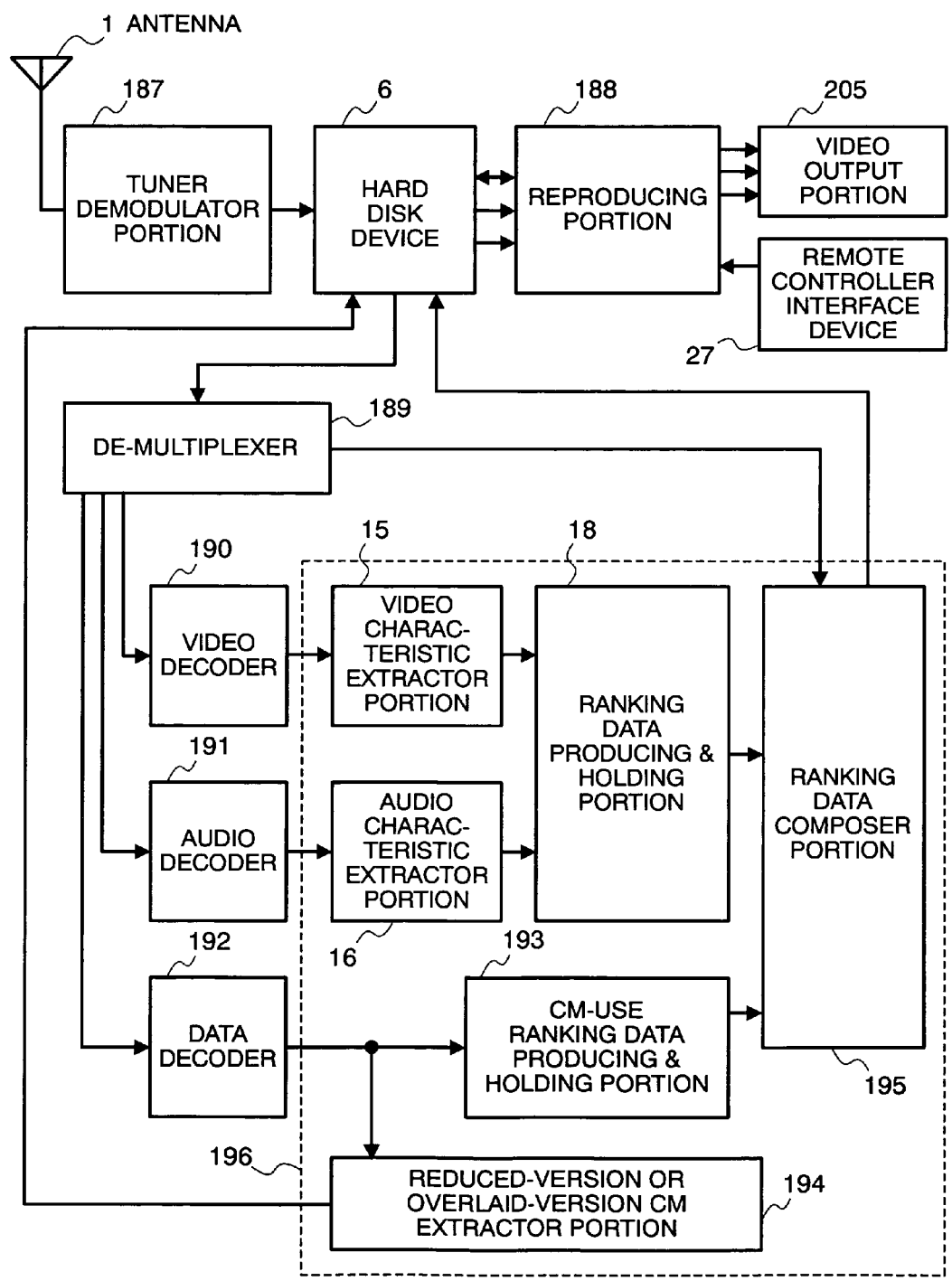
FIG. 27 shows the structure view of a video recording/reproducing apparatus for using data broadcast therein.

A video recording/reproducing apparatus having such functions mentioned above, for using the data broadcast therewith, will be shown below, by referring to the figure thereof. Thus, FIG. 27 shows the structures of the video recording/reproducing apparatus. The antenna 1 is same to that of the embodiment 1. A tuner demodulator portion 187 can receive the digital television broadcast.

A program stream, which is obtained from the tuner demodulator portion 187, is recorded within the hard disk device 6. After completing the recording of program is produced a ranking data of the programs recorded.

A de-multiplexer 189 obtains the record data, to be an object thereof.

A video frame stream from the de-multiplexer 189 is provided to a video decoder 190, an audio frame stream to an audio decoder, and a data stream to a data decoder 192, respectively.

The video characteristic extractor 15, the audio characteristic extractor 16, and the ranking data producing and holding portion 18 have the same functions to those shown in the embodiment 1, respectively.

From the data decoder 192 is outputted data, which is transmitted through the data broadcast. Herein, it is assumed that CM schedule information is transmitted, with using the data broadcast. The CM schedule information will be mentioned later, by referring to FIG. 31. The CM schedule information is the information, such as, of indicating the timed position of CM inserted into a certain program and ranking information, and/or necessity/unnecessary of "replacement", which will be mentioned later, for example.

A CM-use ranking data producing and holding portion 193 produces the CM-user ranking data supplied from the CM schedule information, and store it therein. About the CM-use ranking data will be mentioned later, by referring to FIG. 32.

A reduced version or overlaid version CM extractor portion 194 collects the frame data of the reduced version CM and/or the overlaid version CM, and/or the information relating thereto, among the data stream outputted from the data decoder. The frame data of the reduced version CM and/or the overlaid version CM are stored into the hard disk device 6 in the form of a file. This file can be specified or identified, uniquely, with using a CM stream ID. Also, the reduced version or overlaid version CM extractor portion 194 stores the information relating to the CM stored, as an entry of a reduced version/overlaid version CM database. The reduced version/overlaid version CM database will be mentioned later, by referring to FIG. 33.

Explanation will be made about an inside of a reproducing portion 188, by referring to FIG. 28. A reduced version/overlaid version CM database access portion 200 makes an access to the reduced version/overlaid version CM database 197, so as to read out information therefrom. A ranking data obtaining portion 201 reads out the ranking data from the ranking data 198 stored within the hard disk device 6. A play list producing and holding portion 202 collects the information necessary for producing the play list, through the reduced version/overlaid version CM database access portion 200 and the ranking data obtaining portion 201. A stream designate and readout portion 203 reads out the information of the sections to be reproduced, from a play list 219 held within the play list producing and holding portion 202, and an overlay CM-use play list 220, and it also reads out data of the frames to be reproduce, from the record data 199 within the hard disk device 6. And, it outputs the data of frames, the frame data for use of the overlay CM, and a signal designating on whether overlay should be made or not, to a video output portion 205. The threshold value, which is necessary for producing the play list within the play list producing and holding portion 202, can be obtained from a threshold value input portion 204. The remote controller interface device 27 has the same function to that shown in the embodiment 1.

Explanation will be made about an inside of the video output portion 205, by referring to FIG. 29. Data of the frames, which are outputted from the stream designate and readout portion 203, are inputted into an output de-multiplexer 206. The output de-multiplexer 206 extracts the video streams and the audio streams from the video/audio streams. And, it supplies the audio streams to an output audio decoder 207. Also, it supplies the video streams to an output video decoder 208.

The frame data for use of the overlay CM, which are outputted from the stream designate and readout portion 203, are supplied to an overlay CM-use frame holding portion 209. The overlay CM-use frame holding portion 209 holds therein the frame data of the overlay CM. The signal indicating the overlay CM display, supplied from the stream designate and readout portion 203, is supplied through a route 218 to an overlay CM-use video decoder 212 and a switch 210. The overlay CM-use video decoder 212, upon supply of that signal, reads out the frame data of the overlay CM, which are held within the overlay CM-use frame holding portion 209, repetitively, and thereby outputting them to the switch 210 after decoding thereof.

The overlay CM-use frame holding portion 209 can hold plural pieces of frames therein, and the overlay CM-use video decoder 212 reads out those frames, repeatedly and in series. With using this function, it is possible to apply an animation onto the overlaid version CM.

The switch 210 outputs the video of overlay CM to an output video composer portion 211, upon basis of the signal outputted from the stream designate and readout portion 203. The output video composer portion 211 outputs the video, after blending the video of the overlay CM onto the video of program and/or the normal CM, which are obtained from the output video decoder 208.

Explanation will be made about an inside of the stream designate and readout portion 203, by referring to FIG. 30. A play list reproducing potion 214 reads out the entry of the play list from the play list 219, which is held in the play list producing/holding portion, and it instructs a frame readout portion 213 to read out the necessary video/audio frame data from the hard disk device 6. The frame readout portion 213 supplies the video/audio frame data through a route 216 to the video output portion 205.

In case where the value of an overlay column of the play list entry is such, being indicative of overlaying, a signal indicating a start of display of the overlay CM is issued, from the play list reproducing potion 214 to an overlay CM-use play list reproducing portion 215.

The overlay CM-use play list reproducing portion 215 reads out the play list entry from the overlay CM-use play list 220, and it instructs the frame readout portion 213 to read out the frame data necessary for the overlay CM from the hard disk device 6. The frame readout portion 213 provides the video frame data of CM through a route 217 to the video output portion 205. The overlay CM-use play list reproducing portion 215 outputs an overlay CM output indication signal for controlling the switch 210 shown in FIG. 29, with using the route 218. The switch 210 is closed when the overlay CM output indication signal is outputted, and the overlay CM-use video decoder 212 starts the operation thereof; therefore, an output thereof is outputted to the output video composer portion 211.

Explanation will be made about the CM schedule information, which can be obtained from the data broadcast streams, by referring to FIG. 31. A reference numeral 221 is that for presenting the CM schedule information in the form of a table. The CM schedule information 221 comprises a CMID column 222, a relative time column 223, and a ranking ratio column 224. The relative time is the time system of making the start time of program "0", and it can be converted into a frame number of the stream recorded. The ranking ratio can be converted into the ranking data within this video recording/reproducing apparatus, by multiplying it by the maximum value of ranking values.

Entry 225 indicates that the ranking ratio of the frame is 100%, CM1 of which is at "t1" of the relative time. In the similar manner, entry 226 indicates that the ranking ratio of the frame is 10%, CM1 of which is at "t2" of the relative time. It is assumed that, in the similar manner to the entries 225 and 226, the ranking value ratios are determined for all of the frames, corresponding to the sections from "t1" to "t2" of the relative time. With using the information from the entry 225 to the entry 226, it is possible to obtain the ranking data corresponding to the CM-use ranking data within the embodiment, for the CM where CMID is CM1.

Entries 227, 276, 228 and 277 are the CM schedule information, but in the format differing from that of the ranking data with respect to CM1. The entry 227 indicates that CM2 can be displayed, being replaced by CM of the reproduced version or the overlaid version, at the frame number corresponding to the relative time "t3". The entry 276 indicates the relative time "t4" when the original CM2 ends. In the similar manner, the entry 228 indicates that CM3 can be displayed, being replaced by CM of the reproduced version or the overlaid version, at the frame number corresponding to the relative time "t5". The entry 277 shows a relative time "t6" when the original CM3 ends. The schedule information for CM2, which is defined by the entries 227 and 276, and the same for CM3, which is defined by the entries 228 and 277, are presumed to utilize the CM frame data, which can be obtained from the data broadcast streams.

Through conversion of the CM schedule information shown in FIG. 31 can be obtained the CM-use ranking data. That expressing of the CM-use ranking data in the form of a table is the CM-use ranking data 229, which is shown in FIG. 32. The CM-use ranking data 229 is composed of a frame number column 230, a ranking value column 231, and a CMID column 232. It is a CM-use ranking data entry 233, which can be obtained through conversion of the entry 225 within the CM schedule information. The frame number can be obtained through conversion of the relative time of the entry 225 into the frame number within the recorded streams. The ranking value can be obtained, by multiplying the ranking ratio of the entry 225 with the maximum value of ranking values within this video recording/reproducing apparatus. In this example, since the ranking ratio is 100%, then the ranking value takes the maximum value thereof. The CMID is the value of CMID of the entry 225 itself. In the similar manner, a CM-use ranking data entry 234 can be obtained, by converting the entry 226, in the similar manner.

It is a CM-use ranking data entry 235, which can be obtained through the conversion of the entry 227. The frame number 34,350 can be obtained through conversion of the relative time "t3", in the similar manner to the above. Regarding the ranking value, data for designating "replace CM" is entered into the ranking ratio column, within the entry 227. Also, in the similar manner, data for designating "replace CM" is entered into the ranking value column of the CM-use ranking data entry 235. CM is entered therein, but without conversion thereof.

It is a CM-use ranking data entry 278, which can be obtained through conversion of the entry 276 next to the entry 227. The entry 276 holds the relative time "t4" when the CM2 (i.e., before replacement) ends. The entry 278 indicates the frame number, which can be obtained through conversion of "t4" in the similar manner mentioned above, i.e., the frame number at which the CM2 (i.e., before replacement) ends, and the value of which is 35,249.

It is a CM-use ranking data entry 236, which can be obtained through conversion of the entry 228. The frame number 46,820 can be obtained through conversion of the relative time "t5" in the similar manner mentioned above. Regarding the ranking value, data for designating "replace CM" is entered, in the similar manner to that of the entry 235. The CMID is entered therein, but without conversion thereof. It is a CM-use ranking data entry 279, which can be obtained through conversion of the entry 227 next to the entry 228. The entry 277 holds the relative time "t6" when the CM3 (.i.e., before replacement) ends. The entry 279 indicates the frame number, which can be obtained through conversion of "t6" in the similar manner mentioned above, i.e., the frame number at which the CM3 (i.e., before replacement) ends, and the value of which is 47,719.

Explanation will be made on the reduced version/overlaid version CM database 197, by referring to FIG. 33. This is a database for holding the information relating to CM, which are extracted by the reduced version or overlaid version CM extractor portion 194 and stored within the hard disk device 6 in the form of files. The reduced version/overlaid version CM database 197 is composed of a stream name column 238, a CMID column 239, an abridging ratio column 240, a CM stream ID column 241, a frame number column 242, a type column 243, and a display frame number count column 244. Each of those information, as well as, the video frame data of the reduced version/overlaid version CM, are extracted from the data streams accompanying with the video data.

In the present embodiment, it is assumed that the stream data recorded are that for recording "program A". The CM, which is extracted from the data streams of the "program A". The stream name of the entry 245 has a value of "program A". The stream name is also used as the record data ID; therefore, it is possible to identify the record data of recording the program. "A" within the hard disk device 6.

The value of the CM ID of the entry 245 is "CM2". From the above, it can be understood that the entry 245 relates to CM2 of the "program A".

An abridging rate or ratio is defined as follows. It is assumed that the abridging rate or ratio is a value obtained, dividing the threshold value, which the viewer designates when reproducing the abridgement, by the maximum value of the ranking values. In the present embodiment, it is indicated by %. The value of the abridging ratio column of the entry 245 is "0% through 40%". When the abridging ratio takes a value between from 0% to 40%, for example, it indicates that CM2 is displayed by using the information of the entry 245. In the similar manner, the abridging ratio of the entry 246 is "41% through 70%", and when abridging ratio takes a value between from 41% to 70%, for example, it indicates that CM2 is displayed by using the information of the entry 246. If there is no entry, the CMID value of which comes to "CM2" other than the entries 245 and 246, or in case of the remaining one of the abridging ratios, i.e., "71% through 100%", it is impossible to replace the CM2. In this case, the CM2 is reproduced within the recorded stream data of the program A, but without replacing the CM2.

The value of the CM stream ID column of the entry 245 is "A2T1". This is an ID for identifying a file, which is extracted by the reduced version or overlaid version CM extractor portion 194 and stored within the hard disk device 6, i.e., a file name. The value of the CM stream ID column of the entry 245 is "A2T1". Thus, it indicates that the CM frame data, which can be replaced to be the CM2 when the abridging ratio lies in the range "0% through 40%" is a file name "A2T1", or that the CM frame data, which can be replaced to be the CM2 when the abridging ratio lies in the range "41% through 70%" is a file name "A2T2".

The value of the frame number column of the entry 245 is "300", and the value of the frame number column of the entry 246 is "450".

The value of the type column of the entry 245 is "reduced version", and the value of the type column of the entry 245 is also "reduced version". In the present embodiment, the value of this column is either "reduced version" or "overlaid version".

In case of the "reduced version", the display frame number count column comes to the value same to that of the frame number column. For example, in case where the CM2 is displayed, being replaced by "A2T1" of the entry 245, since the CM2 ends when reproducing the frame of the frame number 300 of "A2T1", then the count of the display frame number also comes to 300.

Entries 247 and 248 are the entries of the overlaid version CM. The entry 247 indicates that the CM3 of the "program A" is displayed in the form of the overlay of 30 frames within the file, the stream ID of which is "A301", when the abridging ratio thereof lies in a range "0% through 50%". A period for displaying the overlay is indicated by the value of the display frame number count column 244. In case of the entry 247, it is $1,800^{th}$ frame. During time period from starting display of the overlaid version CM of the CM3 up to the frame display of the $1,800^{th}$ frame, overlay display is made 60 times on an animation, which is repeated every 30 frames, and the overlay display is stopped from the next frame.

In the similar manner, the entry 248 indicates that the CM3 of the "program A" is displayed in the overlay format of one (1) frame within a file, the stream ID of which is "A3O2", for 3,600 frames.

Explanation will be made on the operations of a ranking data composer portion 195 shown in FIG. 27. The ranking data composer portion 195 starts composition of the ranking data when receiving the signal indicative of the end of the record data from the de-multiplexer 189. The ranking data producing and holding portion 18 holds the ranking data 144 of the recorded data therein, in the similar manner to that of the embodiment 1 (see FIG. 20). The CM-use ranking data producing and holding portion 193 holds the CM-use ranking data 229 therein (see FIG. 32).

It is assumed that the ranking data 144 and the CM-use ranking data 229 are sorted in an ascending order of the frame number, respectively. Designation is made on the entry to be taken out from the ranking data 144, such as, by means of an entry pointer (hereinafter, being abbreviated by "EP"). The value of EP is the frame number of the entry to be taken out. With using the frame number as a key is searched out the entry, the value of which is same to the value of EP, from the ranking data 144.

Explanation will be made on the composing means of the ranking data, by referring to FIG. 38. In a step 282 is started the composing process. In a step 283 is set up an initial value of EP. It is assumed that the initial value is the minimum value of the frame number columns within the ranking data 144. In a step 284 is searched out the entry, the frame number of which is coincident with the value of EP, from the ranking data 144. For the purpose of explanation, the said entry is presented by an entry "A". Next, in a step 285 is searched out the entry, the frame number of which is same to the frame number of the entry "A", from the CM-use ranking data 229. In a step 286, determination is made on whether the search makes a hit or not, and in case where it does not makes a hit, the process is divided into a step 287. In the step 287, an entry is newly added to the ranking data 249 composed (see FIG. 34). The frame number and the ranking value of that entry to be added are set up with same data to those of the entry "A". Into CMID of the entry to be added is set "null", being a value indicating that the frame corresponding to the said entry is not the frame of CM. Next, in a step 288, the value of EP is added by one (1), and the process advances to a step 293.

The process advances to a step 289 when making a hit in the step 286. For the purpose of making explanation about the entry, upon which a hit is made thereon, it is presented by an entry "B". In the step 289, a new entry is added to the ranking data 249 composed. For the entry to be added, data is set up, being same to that of the entry "B". In a step 290, search is made on whether the value of the ranking value of the entry "B" is "replace" or not, and in case where it is not, the process is divided into a step 288, or into a step 291 in case where it is so. In the step 291, an entry is newly added to the ranking data 249 composed. An entry next to the entry "B" of the CM-use ranking data 229 is made up to be an entry "C". To the entry to be added the data of the entry "C" are set up. Next, in a step 292, a value obtained by adding "1" to the frame number of the entry "C" is set to be the value of EP.

In a step 293, check is made on whether process is conducted or not, upon all of the entries of the ranking data, and in case where there is an entry unprocessed, the process is divided into the step 284, thereby conducting the processes, repetitively. In case where there is no entry unprocessed, the composition of the ranking value is ended. After completion of the composition, the ranking data composed are sorted in an ascending order of the frame number. The ranking data 249 completed are stored into the hard disk device 6. Production of the ranking data 249 must be conducted when starting reproduction of the abridgement, after completing the recording thereof.

Figure 28:
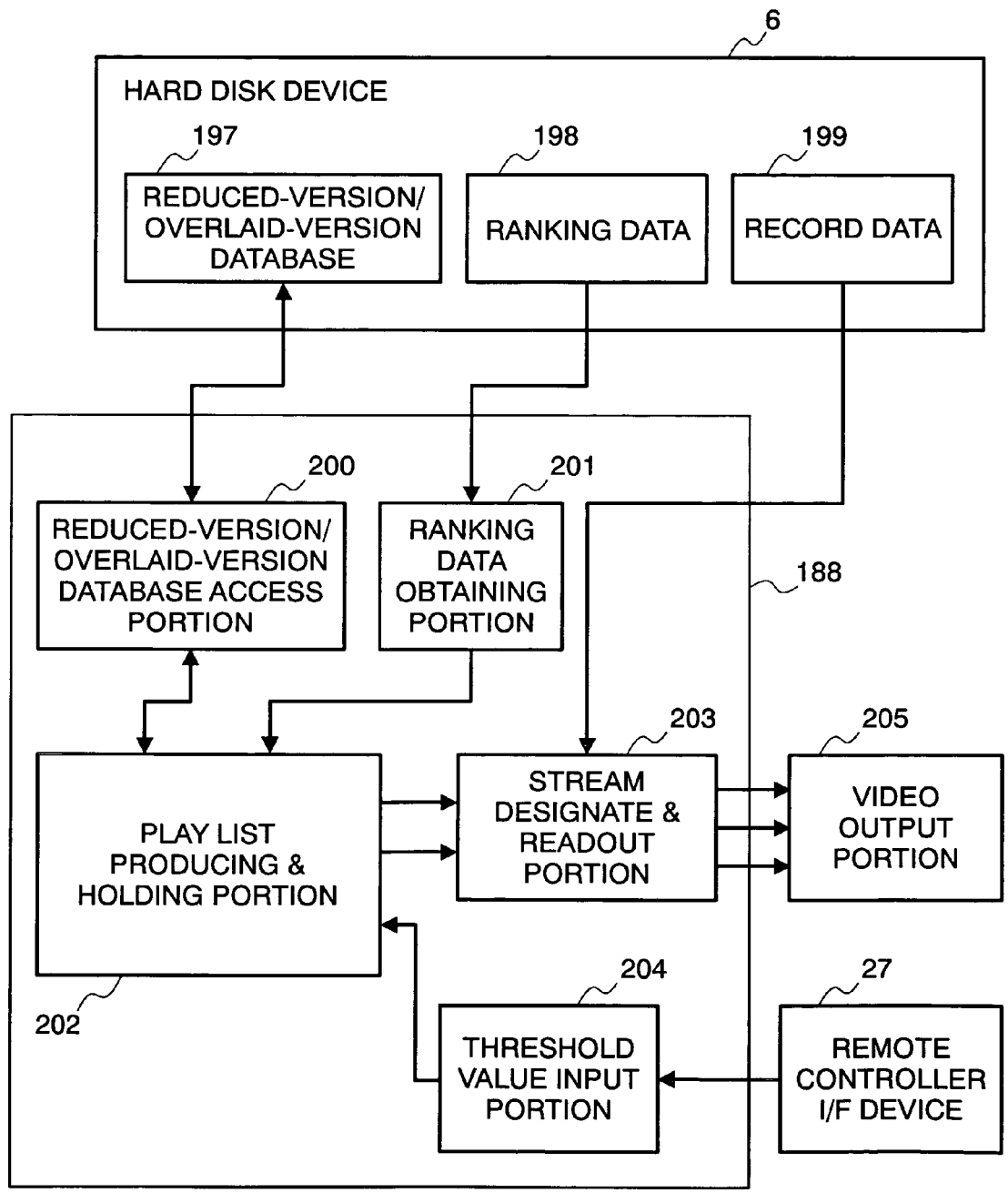
FIG. 28 shows the structure view of a reproducing portion of the video recording/reproducing apparatus for using data broadcast therein.

When an indication is made by the viewer, upon execution of reproduction of the abridgement, the play list producing and holding portion 202 starts production of the play list (see FIG. 28). This one differs from the embodiment 1, in an aspect that an overlay-use play list 270 shown in 3 is produced, in addition to the play list 258 shown in FIG. 35. Firstly, explanation will be made on the production of the play list 258. The threshold value designated by the viewer is determined when executing the reproduction of abridgement. In the similar manner to the embodiment 1, by comparing the ranking value of each of the entries composed within the ranking data 249 to the threshold value, the entries having the ranking values larger than the threshold value are grouped. The frame number of the entry is set to "FS", the ranking number of which exceeds the threshold value. Thereafter, search is conducted on the entries in the order of the frame numbers thereof, and the value obtained by subtracting "1" from the frame numbers is set to "FE", the ranking values of which are lower than the threshold value. Or, in case where the value of CMID is changed before the entry appears, the ranking value of which is lower than the threshold value, the value obtained by subtracting "1" from the frame number of the entry is set to "FE", CMID of which is changed.

After determining "FS" and "FE", then one (1) piece of the reproducing section is determined, the entry is inserted into the play list 258, as an example of the entry 263 (FS=10,000, FE=18,000) of the play list 258. The reproducing section of the entry 263 is applied onto the record data of the program A.

After determining the one (1) piece of reproducing section, then the operations mentioned above are repeated from the next ranking entry. Herein, "next ranking entry" differs in the definition thereof, depending on the way of determining "FE". In the case where "FE" is determined upon basis of the entry of the frame number, the ranking value of which is lower than the threshold value, then the "next ranking entry" means the ranking data entry of "FE+1" in the frame number thereof. Or, in the case where "FE" is determined upon basis of the ranking data entry, the CMID of which is changed, then the "next ranking entry" means that ranking data entry, the CMID of which is changed.

Also, the reproducing section of CM1 can be determined, in the similar method. That corresponding to the reproducing section of CM1 is the play list entry 264. Since the video stream of CM1 is included within the record data of the "program A", then the stream name comes to be "program A", indicating that FS=19,830 and FE=20,280. Entries 265, 267 and 269 are also determined, in the similar manner. The method mentioned above is same to that in the case of the embodiment 1.

Next, explanation will be made on the processes in relation to an entry 256 of the ranking data 249. This entry comes to be a value meaning that the ranking value column should be replaced. In this case, the play list producing and holding portion 202 searches the reduced version/overlaid version CM database 197, with applying the stream name and CMID and the abridging ratio to be the keys. Assuming that the abridging ratio is 60%, in this example, then the search is made under the condition; i.e., the value of the stream name="program A", CMID="CM2", the abridging ratio="60%". Among the reduced version/overlaid version CM database 197, the entry 246 hits on this condition. It can be understood that the frame data of CM to be reproduced is the file name="A2T2", and that reproduction must be conducted on the CM of reduced version, the frame number of which is 450. With using that information, determination is made on the value of an entry 266 of the play list 258. The stream name comes to "A2T2", the start-point frame number "0", and the end-point frame number the value, which can be obtained by subtracting the sum of the start-point frame number and the frame number 450, by one "1" (=(start-point frame number+the frame number)−1). Into the value of the overlay column is entered "null", indicative of not the CM of overlaid version.

Explanation will be made of the case, where there is no entry fitting thereto, as a result of the search on the reduced version/overlaid version CM database 197 mentioned above. In this case, reproduction is made on the original CM2 within the record data of the program, but without replacing it with the CM2. From the frame number of the entry 256, it can be understood that the start-point frame number of the CM2 within the record data is 34,350. The end-point frame number can be obtained from the next entry 280 to the entry 256. The frame number 35,249 of the entry 280 is the end-point frame number of the CM2. In this manner, it is possible to determine the reproducing section, with production of the play list entry, even in case when no replacement occurs. Thereafter, the operation is repeated from the next ranking entry, in the similar manner mentioned above. Herein, "the next ranking entry" means the entry next to that entry, the end-point stream number of which was obtained.

Next, explanation will be made on the processes in relation to an entry 257 of the ranking data 249. In this entry, the ranking value column thereof is set at the value of meaning that CM should be replaced. Accordingly, in the similar manner to the above, the search is made on the reduced version/overlaid version CM database 197, under the condition; i.e., the value of the stream name="program A", CMID="CM2", the abridging ratio="60%". The entry 248 of the reduced version/overlaid version CM database 197 fits to this condition. From the entry 248, it can be understood that the frame data of CM to be reproduced is the file name="A3O2", and that reproduction must be made on the overlaid version CM, having the frame number "1" and the display frame number 3,600. With using those information, determination is made on the number of the entry 268 of the play list 258.

Because the stream name is "A3O2" and it is the overlaid version CM, "null" is entered into both of the start-point frame number and the end-point frame number. Into the value of the overlay column is entered the value, indicative of being the overlaid version CM. In such the manner as was mentioned above, the play list 258 is produced.

In the mentioned above, it can be understood that reproduction is necessary for the overlaid version CM, when producing the entry 268 of the play list 258. In this case, there is also a necessity of inserting the entry of the overlay-use play list 270 (see FIG. 36) for managing reproduction of the overlaid version CM, as well. And, there is also other necessity of determining the start-point frame number, the end-point frame number, the CM stream ID, and the display frame number. The start-point frame number is "0". Since the frame number of the entry 248 is "1", the start-point frame number also comes to "0". The value of the CM stream ID is "A3O2". The display frame number comes to 3,600 from the value of the display frame number of the entry 248. The entry 275 is inserted into the overlay-use play list 270.

Figure 29:
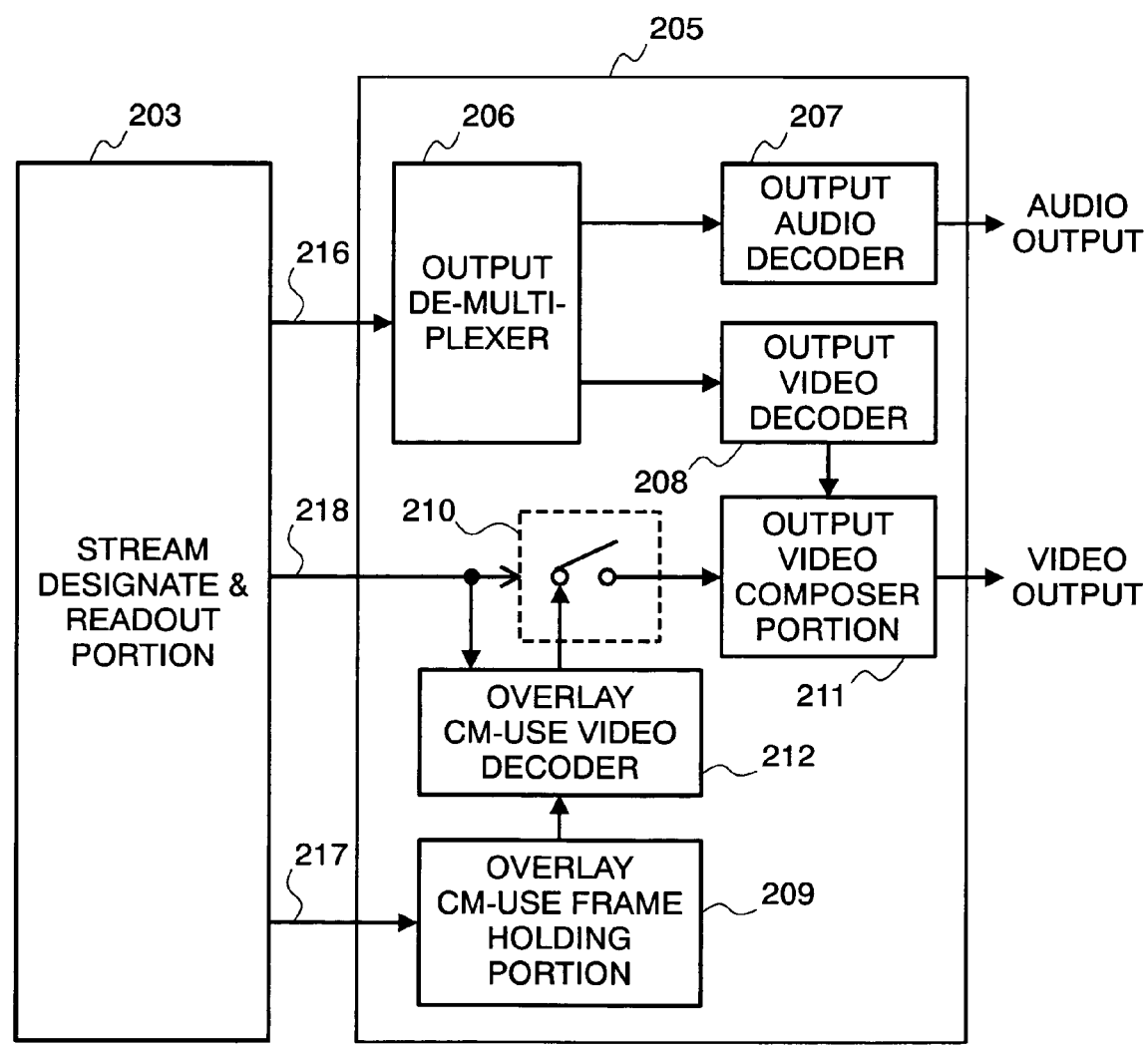
FIG. 29 shows the structure view of a video output portion having a video composer portion therein.
Figure 30:
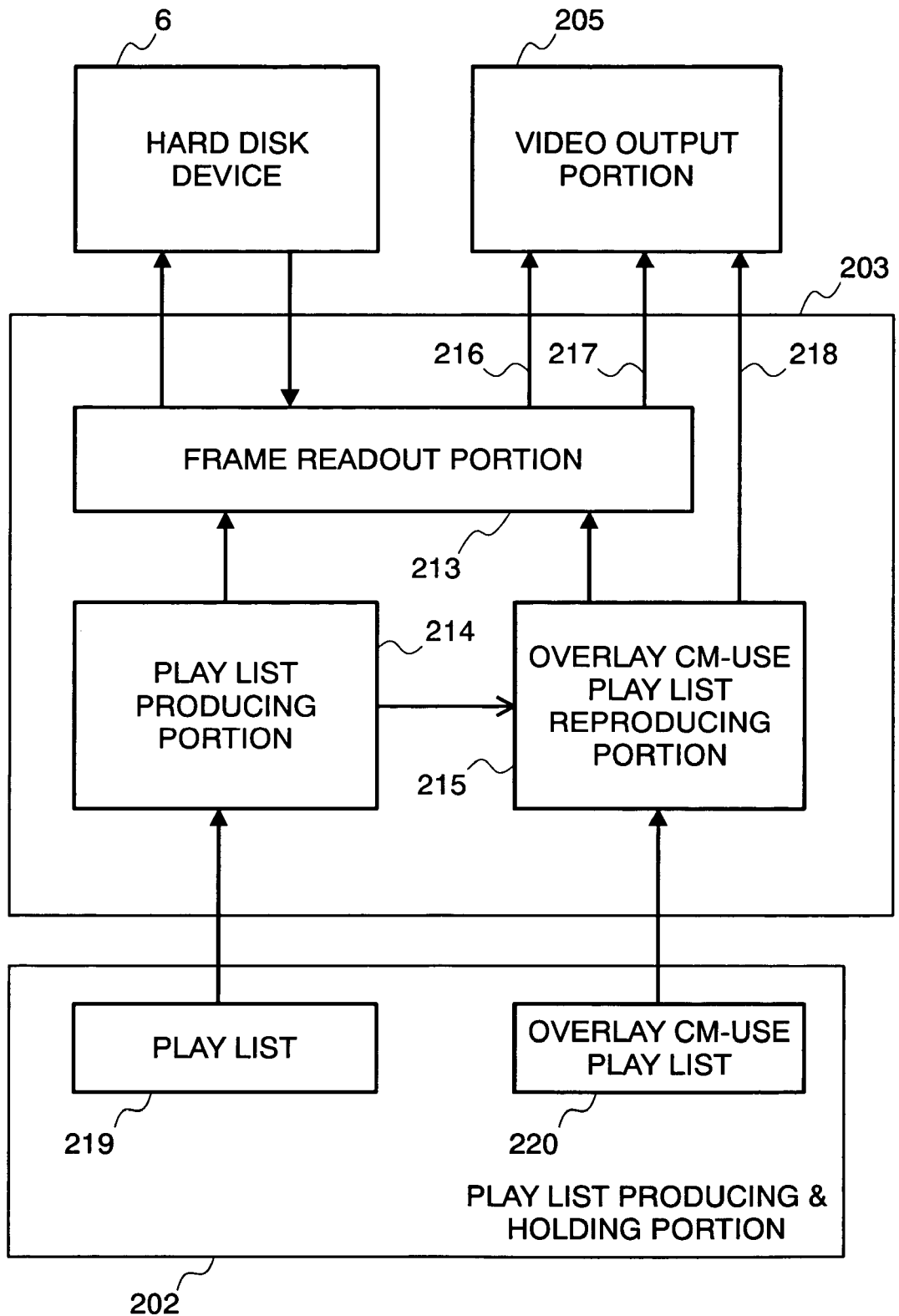
FIG. 30 shows the structure view of an inside of the stream designation and readout portion.
Figure 37:
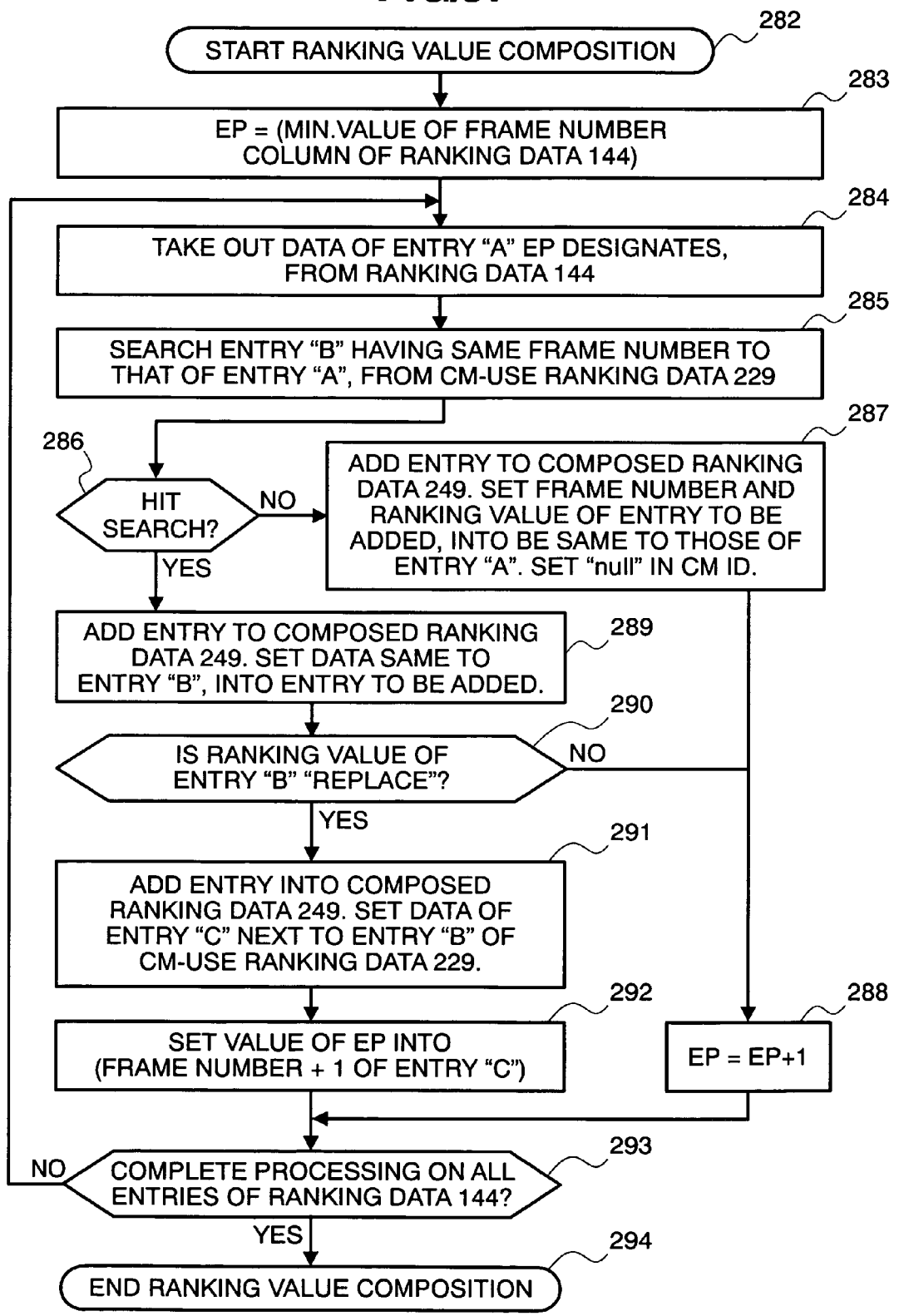
FIG. 37 is a flowchart for showing a method for composing the ranking values.

With using the play list 258 and the overlay-use play list 270, which are produced as was mentioned above, and in accordance with the methods explained in FIGS. 29 and 30, it is possible display the reduced version or overlaid version CM.

Next, in addition to the example mentioned above will be made explanation, upon an example of editing the position for inserting CM, thereby assisting the view when producing the abridgement. In more details, the "assisting the view" means to insert CM as many as possible, just in front of the scene, which has high ranking value (i.e., so-called the climax scene), or to insert CM at a constant time period during when reproducing the abridgement. According to the former, for the viewer, it is possible to notice of appearance of the portion, which is high on the ranking estimation, when the CM is reproduced, continuously. According to the latter, it is possible to notice the elapsing time of reproduction at the timing when reproducing CM.

When editing the position for inserting CM, within the ranking data composer portion 195 (see FIG. 27), each of the ranking data 144 (see FIG. 20) and the CM-use ranking data 229, without composing thereof, is stored into the hard disk device 6, independently, in the form of a file. When instruction is made from the viewer, upon starting reproduction of the abridgement, as well as, on the threshold value, then the production is started on the play list and the CM-use play list, within the play list producing and holding portion 202.

A play list 295 shown in FIG. 38 is that for the stream of the main edition of program (other than CM). The play list 295 can be obtained by applying the threshold value, which the viewer designates, onto the ranking data 295 stored in the hard disk device 6 in the form of the file. Although means for producing the play list 295 is same to that means, for producing the entries of the reproducing section of the play list 258, but other than CM, from the composed ranking data 249 mentioned above, however, in addition thereto, it also calculates out an average value of the ranking values of the frames included within each the reproducing section. The play list 295 is composed of a stream name column 296, a start-pint frame number column 297, an end-point frame number column 298, an averaged ranking value column 299, and an overlay column 300. The stream name column 296, the start-pint frame number column 297, the end-point frame number column 298 and the overlay column 300 have the same meanings of those in the play list 258 (see FIG. 35). Within the averaged ranking value column 299 is set up an average value of the ranking values of the frames within that reproducing section. The overlay column 300 comes to be necessary, in case when the entry of CM enters into, due to edition thereof conducted later, but within the play list 295 with respect to the streams of the main edition of program, only "null" is set into, meaning "an overlay is not conducted".

In the example listed in FIG. 38, there are shown entries 301, 302, 303 and 304, which are obtained when applying a certain threshold value onto the "program A".

The entry 301 indicates the reproducing section, from the frame number 10,000 up to the frame number 13,999, within the steam of the "program A", and it can be seen that the averaged ranking value is 70. It is assumed the reproducing section corresponding to this entry 301 is the reproducing section "A".

In the similar manner, the entry 302 indicates the reproducing section; from the frame number 21,000 up to the frame number 22,999, within the steam of the "program A", and the averaged ranking value thereof is "80". And, it is assumed the reproducing section corresponding to this entry 302 is the reproducing section "B".

In the similar manner, the entry 303 indicates the reproducing section from the frame number 36,000 up to the frame number 38,999; within the steam of the "program A", and the averaged ranking value thereof is "200". And, it is assumed the reproducing section corresponding to this entry 303 is the reproducing section "C".

In the similar manner, the entry 304 indicates the reproducing section from the frame number 47,000 up to the frame number 52,399; within the steam of the "program A", and the averaged ranking value thereof is "80". And, it is assumed the reproducing section corresponding to this entry 304 is the reproducing section "D".

In the example, the reproducing sections of the main edition of program are those four (4) mentioned above.

A play list 305 shown in FIG. 39 is the CM-use play list for CM. The play list 305 can be obtained by applying the threshold value the viewer designates onto the CM-use ranking data 229, which is stored in the hard disk device 6 in the form of the file. Although means for producing of the CM-use play list 305 is same to the means, for producing the entries of the reproducing section of CM on the play list 258, from the composed ranking data 249 mentioned above.

The CM-use play list 305 is composed of a stream name column 306, a start-pint frame number column 307, an end-point frame number column 308, and an overlay column 309. Every column has the same meaning of those of the play list 258 (see FIG. 35). In the example shown in FIG. 39, there are entries 310, 311 and 312.

The entry 310 corresponds to one (1) piece of the reproducing section of CM, within the streams of "program A". The start-point frame number is 11,000, the end-point frame number 11,453, and it is indicated that this is not of the overlaid version. It is assumed that the reproducing section, corresponding to this entry 310, is a CM reproducing section "a".

It is assumed that the entry 311 is based on the entry 235 and the entry 278 of the CM-use ranking data 229 (see FIG. 32). The entry 311 corresponds to CM of the reduced version, and it corresponds or fit to the entry 246 of the reduced version/overlaid version CM database 197. From the $0^{th}$ frame to the $449^{th}$ frame in the stream having the stream name of "A2T2" (i.e., the whole frames of "A2T2") is the reproducing section. It is assumed that the reproducing section corresponding to this entry 311 is "b".

It is assumed that the entry 312 is based on the entry 236 and the entry 279 of the CM-use ranking data 229 (see FIG. 32). The entry 312 corresponds to CM of the overlaid version, and it corresponds or fits to the entry 248 of the reduced version/overlaid version CM database 197. The frames having the stream name of "A3O2" are the reproducing section to be displayed with an overlay. It is assumed that the reproducing section corresponding to this entry 312 is "c". Since the entry 312 is CM of the overlaid version, it is also necessary to add the entry into an overlaid version play list, as is similar to the means mentioned above. The overlaid version play list 313 shown in FIG. 40 is composed of a start-point frame number column 314, an end-point frame number column 315, a CM stream ID column 316, and a display frame number column 317. Every column has the same meaning to those of the overlay-use play list (see FIG. 36). The CD stream ID has the same meaning to the stream name. Entry corresponding to the entry 312 is an entry 318. It can be seen that one (1) frame included within the stream "A3O2" is repeated for 3,600 frames, from the reduced version/overlaid version CM database 197, thereby conducting the overlay display. Therefore, with the entry 318, both the start-point frame number and the end-point frame number thereof come to "0" (because of only one (1) frame), the CM stream ID to "A3O2", and the display frame number to 3,600.

Next, an example of editing the play list will be shown, by referring to FIG. 41. In this example, an edition is conducted, such that CM is concentrated in front of the scene having the high-ranking value. Herein, it is assumed that 70% of all CM is inserted in front of the reproducing section (i.e., the scene) at the maximum in the averaged ranking value while 30% thereof in from of the scene at the second in the averaged ranking value.

Within the play list 295, the highest in the averaged ranking value is the reproducing section "C" corresponding to the entry 303, and the second one is the reproducing section "D" corresponding to the entry 304. Since the entry number is "3" in the CM-use play list, all of the CM reproducing sections are three (3). Among of those, two (2) corresponds or fits to 70% and one (1) to 30%. If inserting CM in the order of the CM-use play list, then the CM reproducing section "a" and the CM reproducing section "b" are inserted in front of the reproducing section "C". Also, the CM reproducing section "c" is inserted in front of the reproducing section "D". Therefore, the order of reproduction is as follows: the reproducing section "A"→the reproducing section "B"→the CM reproducing section "a"→the CM reproducing section "b"→the reproducing section "C"→the CM reproducing section "c"→the reproducing section "D".

That obtained by editing the play list, in the manner motioned above, is a play list 319. The play list 319 is composed of a stream name column 320, a start-point frame number column 321, an end-point frame number column 322, and an overlay column 323. Those columns have the same meaning to those of the play list 258 (see FIG. 35), each.

An entry is added into the play list 319, in the order of reproductions mentioned above. From the data of the entry 301 (reproducing section "A") of the play list 295 is determined data of the entry 324. From the data of the entry 302 (reproducing section "B") of the play list 295 is determined data of the entry 325. From the data of the entry 310 (CM reproducing section "a") of the CM-use play list 305 is determined data of the entry 326. From the data of the entry 311 (CM reproducing section "b") of the CM-use play list 305 is determined data of the entry 327. From the data of the entry 303 (reproducing section "C") of the play list 295 is determined data of the entry 328. From the data of the entry 312 (CM reproducing section "c") of the CM-use play list 305 is determined data of the entry 329. From the data of the entry 304 (reproducing section "D") of the play list 295 is determined data of the entry 330.

With using the play list 319 and the overlaid version play list 313, which are determined in such the manner as mentioned above, it is possible to execute reproduction of the abridgement by the means mentioned above, which were explained by referring to FIG. 30.

Next, other example of the play list is shown, by referring to FIG. 42. In this example, edition is made upon CM, so that it is inserted at a constant time-distance from starting of reproduction of the abridgement. Herein, it is assumed that CM is inserted into, every two (2) minutes, from the starting of reproduction of the abridgement. Also, it is assumed that the frame rate is thirty (30) frames per second. Insertion of CM every two (2) minutes means an insertion of CM per 3,600 frames.

First 3, 600 frames are within the reproducing section "A" corresponding to the entry 301 of the play list 295. Therefore, the reproducing section "A" is divided into two (2) sections, i.e., the first 3,600 frames and remaining thereof. It is assumed that the divided reproducing sections are called by "A1" and "A2", respectively. Between those reproducing sections "A1" and "A2" is inserted an entry (CM reproducing section "a") of the CM-use play list 305.

In this manner, it is a play list 331, which can be obtained from dividing the reproducing section by the frame number thereof, at which CM should be inserted, depending upon the necessity thereof. The play list 331 is composed of a stream name 332, a start-point number column 333, a end-pint number column 334, and an overlay column 335. Those columns have the same meaning to those of the play list 258 (see FIG. 35), each.

As was mentioned above, the reproducing section "A" is divided into the reproducing section "A1" and the reproducing section "A2". The reproducing section "A1" comes to be a section, starting from the start-point number 10,000 and including 3,600 frames therein. Therefore, the end-point frame number is 13,599. It is an entry 336 corresponding to this reproducing section "A1". The value of the overlay column of the entry 336 is same to that of the entry 301.

An entry 337 comes to be the reproducing section of CM to be inserted. From data of the entry 310 of the CM-user play list 305, the start-point frame number is 11,000, the end-point frame number 11,453, and the value of the overlay column "null", respectively.

An entry 338 corresponds to the reproducing section "A2" mentioned above. Since it starts from the frame next to that having the end-point frame number 13,599 of the entry 336 (the reproducing section "A1"), then the start-point frame number results to 13,600. The end-point frame number comes to 13,999, being same to the end-point frame number of the reproducing section "A" before division thereof. The value of the overlay column is "null".

Next inserting position of CM is within the reproducing section "C". Then, no division is made on the entry 302 of the play list 295, corresponding to the reproducing section "B". Therefore, applying the data of the entry 302 therein, the star-point frame number of an entry 339 comes to 21,000 and the end-point thereof 22,999, respectively.

The reproducing section "C" is divided into one, starting from a beginning up to $1,200^{th}$ frame, and the other following thereafter. The position where a second CM should be inserted comes to $7,200^{th}$ frame from the beginning of the play list. The frame number of the reproducing section "A" is a value, which can be obtained by adding "1" to subtraction of the start-point frame number from the end-point frame number (=(end-point frame number−start-point frame number from)+1), and then it comes to the 4,000$^{th}$ frame. The frame number of the next coming reproducing section "B" comes to the 2,000$^{th}$ frame, in the similar manner. The frame number of the reproducing section "C" is the 3,000$^{th}$ frame. Therefore, the 7, 200$^{th}$ frame from the beginning is the 1, 200$^{th}$ frame of the reproducing section "C". The reproducing section "C" is divided into a reproducing section "C1" up to the 1,200$^{th}$ frame from the beginning thereof, and a reproducing section "C2" following thereafter. An entry 340 corresponds to the reproducing section "C1". The end-point frame number of that is 36,000 from the start-point frame number of the entry 303 of the play list 295. Since the end-point frame number is up to 1,200$^{th}$ frame in the beginning, then it comes to 37,199. The value of the overlay column is "null".

And entry 341 comes to the reproducing section of CM to be inserted. From data of the entry 311 of the CM-use play list 305, the start-point frame number is "0", the end-point frame number "449", and the value of overlay "null", respectively.

An entry 342 corresponds to the reproducing section "C2" mentioned above. Since it starts from the frame next to that having the end-point frame number 37,199 of the entry 340 (the reproducing section "C1"), the start-point frame number comes to 37,200. The end-point frame number comes to 38,999, similar to the end-point frame number of the reproducing section "C" before the division thereof. The value of the overlay column is "null".

The position where a third CM should be inserted is at 1,800$^{th}$ frame from beginning thereof. The reproducing section "D" is divided into one, from beginning up to 1,800$^{th}$ frame, and the other following thereafter. The numbers of respective frames of the reproducing section "A", the reproducing section "B" and the reproducing section "C" come up to 9,000 in total, therefore the reproducing section "D" is divided into a reproducing section "D1" from beginning up to 1,800$^{th}$ frame, and a remaining one, i.e., a reproducing section "D2".

An entry 343 corresponds to the reproducing section "D1". The start-point frame number thereof is 47,000, from the start-point of the entry 304 of the play list 295. Since it is up to the 1,800$^{th}$ frame in beginning, the end-point frame number comes to 48,799. The value of the overlay column is "null".

An entry 344 comes to be the reproducing section of CM. From data of the entry 312 of the CM-use play list 305, the start-point frame number is "null", the end-point frame number "null", and the value of the overlay column comes to a value indicative of doing of the overlay display (in case when reproducing this entry, while using the overlaid-version CM play list 313, there is used the means, which was mentioned in the above by referring to FIG. 30).

An entry 345 corresponds to the reproducing section "D2" mentioned above. Since it starts from the frame next to that having the end-point frame number 48,799 of the entry 343 (reproducing section "D1"), the start-point frame number comes to 48,800. The end-point frame number comes to 52,399, similar to the end-point frame number of the reproducing section "D" before the division thereof. The value of the overlay column is "null".

With using the play list 331 and the overlaid version play list 313, which are determined in such the manner as was mentioned above, it is possible to execute reproduction of the abridgement (i.e., digest), by the means mentioned above, which were explained by referring to FIG. 30.

From the above, according to the embodiments mentioned above, it is possible to prevent CM from being cutoff, even in the case when viewing the abridgement (digest) of television broadcasts recorded. With this, for the program provider (i.e., the program sponsor), it is possible to maintain a chance of presenting. CM to the viewer. Also, for the viewer who wishes to view only the contents abridged in a short time is presented CM of the reduced version. With this, while maintaining the advantages of viewing the abridgement (i.e., viewing in the short time), it is also possible for the program provider (the program sponsor) to secure the chance of presenting CM.

It is also possible to present all CM recorded, even when viewing the abridgement (digest).

It is also possible to present only a predetermined number of frames for each CM, even in the case when degree of the abridgment is large.

When reproducing the abridgment (the digest), it is possible to replace the CM by a reduced version of CM, which is broadcasted through the data broadcasting of the digital television broadcast.

When reproducing the abridgment (digest), it is also possible to present CM, in particular, before displaying a scene having a high ranking in the evaluation thereof, and therefore, for the viewer it is possible to notice that a range having a high frequency on reproduction is a portion having the high ranking evaluation.

It is possible to insert CM at a predetermined time period or distance during when reproducing the abridgment (digest). The viewer can notice elapsing of time through timing of the reproduction of CM.

It is possible to replace the normal reproduction of CM, by a captioned-version CM, which is broadcasted through the data broadcasting of the digital television broadcast, and thereby to overlay it on a television screen displaying the broadcast contents, in the place of reproducing CM.

By recording the number of reproductions in the past for each CM, it is possible to determine not to reproduce CM, the reproduction of which reaches to a predetermined number, or to substitute with the reduced-version CM or the like, depending upon the reproducing number thereof.

If the viewer indicates a wish to see the original one of that reduced-version CM, with using a remote controller, etc., during reproducing the reduced-version CM, it is possible to switch into reproduction of the original CM. Or, if she/he indicates a wish to see CM presented, repeating, it is possible to reproduce the CM, repetitively. Also, if she/he indicates a wish to store CM presented, it is possible to store that CM into a memory device.

Furthermore, although the explanation was made with using four (4) embodiments therein, the common structures thereof can be applied in common with, mutually, among those embodiments.

What is claimed is:

1. A video recording/reproducing apparatus, comprising:
   a contents input means;
   an evaluating means for evaluating a plural number of frames included within the contents, which are inputted by said contents input means, upon basis of a parameter included in said contents;
   a ranking data producing means for producing a ranking value of each of said frames, upon basis of a result of evaluation, which is obtained within said evaluating means;
   a CM detecting portion for extracting a commercial message from said contents;
   a CM-use ranking data producing means for producing a ranking value of the commercial message, which is detected within said CM detecting portion;

a ranking data composing means for composing the ranking values, which are produced within said ranking data producing means and said CM-use ranking data producing means;

a threshold value inputting means for inputting a threshold value indicative of a ranking value of a frame to be reproduced therethrough; and a reproducing means for determining a reproducing section among said contents upon basis of the threshold value inputted and said ranking value composed, and for reproducing an abridgement corresponding to said reproducing section, wherein said CM-use ranking data producing means determines a ranking value of said commercial message therein, to be higher than said threshold value.

2. The video recording/reproducing apparatus, as defined in the claim 1, wherein said CM-use ranking data producing means determines the ranking value of said commercial message therein, at a maximum value among said ranking values.

3. The video recording/reproducing apparatus, as defined in the claim 1, wherein said CM-use ranking data producing means determines the ranking value of a predetermined frame within said commercial message therein, at a maximum value among said ranking values.

4. The video recording/reproducing apparatus, as defined in the claim 1, further comprising:

a CM portion evaluating means for evaluating the frame of said commercial message included within said contents, upon basis of a parameter included within said commercial message, wherein said CM-use ranking data producing means produces the ranking value of said commercial message frame, upon basis of a result of evaluation, which is obtained within said CM portion evaluating means, and produces an abridgement of said commercial message upon basis of said ranking value.

5. The video recording/reproducing apparatus, as defined in the claim 4, further comprising:

a commercial message reproducing history controller portion, wherein said commercial message reproducing history controller portion records a number of times of reproduction of the commercial message.

6. The video recording/reproducing apparatus, as defined in the claim 4, further comprising:

a commercial message reproducing history controller portion, wherein said commercial message reproducing history controller portion records a number of times of reproduction of an abridgement of the commercial message.

7. The video recording/reproducing apparatus, as defined in the claim 5, wherein said commercial message reproducing history controller portion lowers the ranking value of the frame corresponding to said commercial message reproduced, when reproducing said commercial message by a predetermined number of times.

8. The video recording/reproducing apparatus, as defined in the claim 6, wherein said commercial message reproducing history controller portion lowers the ranking value of the frame corresponding to said commercial message reproduced, when reproducing the abridgement of said commercial message by a predetermined number of times.

9. The video recording/reproducing apparatus, as defined in the claim 5, wherein said commercial message reproducing history controller portion reduces a reproduction time of said commercial message reproduced, when reproducing said commercial message by a predetermined number of times.

10. The video recording/reproducing apparatus, as defined in the claim 6, wherein said commercial message reproducing history controller portion reduces a reproduction time of said commercial message reproduced, when reproducing the abridgement of said commercial message by a predetermined number of times.

11. The video recording/reproducing apparatus, as defined in the claim 1, wherein a reproducing section among said contents and a reproducing section of said commercial message are managed, separately, and said reproducing means displays said commercial message, lying it on said contents reproducing section.

12. The video recording/reproducing apparatus, as defined in the claim 1, wherein a reproducing section among said contents and a reproducing section of said commercial message are managed, separately, and said reproducing means displays said commercial message, inserting it within said contents reproducing section at a predetermined period of time.

13. The video recording/reproducing apparatus, as defined in the claim 1, wherein a reproducing section among said contents and a reproducing section of said commercial message are managed, separately, and said reproducing means obtains an average value of said ranking values, to compare the ranking value of each of said frames with the average value of said ranking values, thereby displaying said commercial message, inserting it in a front of the frame having the ranking value higher than the average value of said ranking values.

14. The video recording/reproducing apparatus, as defined in the claim 4, wherein there is provided a mead for switching to reproduction of a whole editions of the abridgement of said commercial message, when an display exchange instruction is inputted, during when reproduction is made on the abridgement of said commercial message.

15. A method for displaying an abridgement for a video recording/reproducing apparatus, comprising the following steps of:

a step for inputting contents;

a step for evaluating a plural number of frames, upon basis of a parameter included in said contents;

a step for producing ranking value for each of said frames, upon basis of a result of said evaluation;

a step for extracting a commercial message from said contents;

a step for producing a ranking value of the commercial message, which is detected in said above-mentioned step;

a step for composing the ranking values of frames and the ranking value of said commercial message;

a step for inputting a threshold value indicative of a ranking value for a frame to be reproduced; and a step for determining a reproducing section among said contents, upon basis of the threshold value inputted and said ranking value composed, and for reproducing an abridgement corresponding to said reproducing section, wherein a ranking value of said commercial message is determined to be higher than said threshold value.

16. The method for displaying an abridgement, as defined in the claim 15, wherein the ranking value of said commercial message is determined at a maximum value among said ranking values.

17. The method for displaying an abridgement, as defined in the claim 15, wherein the ranking value of a predetermined frame within said commercial message therein is determined at a maximum value among said ranking values.

18. The method for displaying an abridgement, as defined in the claim 15, further comprising the following step:

a step for evaluating the frame of said commercial message included within said contents, upon basis of a parameter included within said commercial message, wherein the ranking value of said commercial message frame is produced, upon basis of a result of said evaluation, and an abridgement of said commercial message is produced upon basis of said ranking value.

19. The method for displaying an abridgement, as defined in the claim 15, further comprising the following step:

a step for managing a reproducing section among said contents and a reproducing section of said commercial message, separately, and thereby displaying said commercial message, lying it on said contents reproducing section.

20. The method for displaying an abridgement, as defined in the claim 15, further comprising the following step:

a step for managing a reproducing section among said contents and a reproducing section of said commercial message, separately, and thereby displaying said commercial message, inserting it within said contents reproducing section at a predetermined period of time.

21. The method for displaying an abridgement, as defined in the claim 15, further comprising the following step:

a step for managing a reproducing section among said contents and a reproducing section of said commercial message, separately, obtaining an average value of said ranking values, to compare the ranking value of each of said frames with the average value of said ranking values, and thereby displaying said commercial message, inserting it in a front of the frame having the ranking value higher than the average value of said ranking values.

* * * * *